United States Patent
Mayer et al.

(10) Patent No.: US 9,962,883 B2
(45) Date of Patent: May 8, 2018

(54) METHOD AND DEVICE FOR REINFORCING AND/OR LINING MATERIAL

(71) Applicant: Woodwelding AG, Stansstad (CH)

(72) Inventors: Jörg Mayer, Niederlenz (CH); Marcel Aeschlimann, Ligerz (CH)

(73) Assignee: WOODWELDING AG, Stansstad (CH)

( * ) Notice: Subject to any disclaimer, the term of this patent is extended or adjusted under 35 U.S.C. 154(b) by 578 days.

(21) Appl. No.: 14/406,561

(22) PCT Filed: Jun. 12, 2013

(86) PCT No.: PCT/CH2013/000102
§ 371 (c)(1),
(2) Date: Dec. 9, 2014

(87) PCT Pub. No.: WO2013/185251
PCT Pub. Date: Dec. 19, 2013

(65) Prior Publication Data
US 2015/0174818 A1    Jun. 25, 2015

Related U.S. Application Data

(60) Provisional application No. 61/659,547, filed on Jun. 14, 2012.

(51) Int. Cl.
B32B 37/00    (2006.01)
B29C 65/08    (2006.01)
(Continued)

(52) U.S. Cl.
CPC .............. *B29C 65/08* (2013.01); *B29C 65/34* (2013.01); *B29C 65/7437* (2013.01);
(Continued)

(58) Field of Classification Search
CPC . B29C 65/08; B29C 65/7443; B29C 66/5227; B29D 99/0089
(Continued)

(56) References Cited

U.S. PATENT DOCUMENTS

| | | |
|---|---|---|
| 6,913,666 B1 | 7/2005 | Aeschlimann et al. |
| 7,160,405 B2 * | 1/2007 | Aeschlimann ........ B29C 65/562 156/298 |

(Continued)

FOREIGN PATENT DOCUMENTS

| | | |
|---|---|---|
| WO | 2008/080238 | 7/2008 |
| WO | 2009/052644 | 4/2009 |
| WO | 2010/045751 | 4/2010 |

*Primary Examiner* — James Sells
(74) *Attorney, Agent, or Firm* — Rankin, Hill & Clark LLP

(57) ABSTRACT

A reinforcement and/or lining method is provided, wherein a thermoplastic reinforcement and/or lining element is subject to mechanical energy impact and mechanical pressure by a tool so that reinforcement and/or lining material of the reinforcement and/or lining element is liquefied and pressed into porous material to reinforce the porous material. In at least one axial depth, the reinforcement and/or lining element is segmented as a function of the circumferential angle so that at this axial depth the circumferential wall of the initial opening in first regions is in contact with the reinforcement and/or lining element and in second regions is not in contact with the reinforcement and/or lining element.

28 Claims, 10 Drawing Sheets

(51) Int. Cl.
*B29C 65/34* (2006.01)
*B29C 65/74* (2006.01)
*B29C 65/00* (2006.01)
*E04B 1/92* (2006.01)
B29L 31/00 (2006.01)
B29C 65/06 (2006.01)
B29C 65/16 (2006.01)
B29C 65/18 (2006.01)
B29K 101/12 (2006.01)
B29C 65/14 (2006.01)

(52) U.S. Cl.
CPC .... *B29C 65/7443* (2013.01); *B29C 66/02242* (2013.01); *B29C 66/304* (2013.01); *B29C 66/3022* (2013.01); *B29C 66/30326* (2013.01); *B29C 66/348* (2013.01); *B29C 66/721* (2013.01); *B29C 66/727* (2013.01); *B29C 66/7392* (2013.01); *B29C 66/8322* (2013.01); *E04B 1/92* (2013.01); B29C 65/06 (2013.01); B29C 65/0681 (2013.01); B29C 65/081 (2013.01); B29C 65/1409 (2013.01); B29C 65/1412 (2013.01); B29C 65/1487 (2013.01); B29C 65/1609 (2013.01); B29C 65/1612 (2013.01); B29C 65/1674 (2013.01); B29C 65/1687 (2013.01); B29C 65/18 (2013.01); B29C 65/3412 (2013.01); B29C 65/3476 (2013.01); B29C 66/032 (2013.01); B29C 66/1122 (2013.01); B29C 66/474 (2013.01); B29C 66/71 (2013.01); B29C 66/7212 (2013.01); B29C 66/72141 (2013.01); B29C 66/72143 (2013.01); B29C 66/73161 (2013.01); B29C 66/7461 (2013.01); B29C 66/7487 (2013.01); B29C 66/9512 (2013.01); B29C 66/9513 (2013.01); B29C 66/9516 (2013.01); B29C 66/9517 (2013.01); B29K 2101/12 (2013.01); B29L 2031/7278 (2013.01)

(58) Field of Classification Search
USPC ........................................................ 156/73.1
See application file for complete search history.

(56) References Cited

U.S. PATENT DOCUMENTS

| | | | |
|---|---|---|---|
| 7,172,420 | B2 | 2/2007 | Huguenin et al. |
| 7,727,658 | B2 | 6/2010 | Enjoji et al. |
| 7,950,129 | B2 * | 5/2011 | Clinch .............. B29C 66/43421 29/505 |
| 8,314,359 | B2 | 11/2012 | Bovatsek et al. |
| 8,550,759 | B2 * | 10/2013 | Clinch ...................... F16B 5/01 156/73.1 |
| 2002/0056707 | A1 | 5/2002 | Pinho et al. |
| 2003/0159294 | A1 | 8/2003 | Whittenbury |
| 2005/0042456 | A1 | 2/2005 | Krause et al. |
| 2008/0199249 | A1 * | 8/2008 | Clinch ...................... F16B 5/01 403/280 |
| 2011/0062617 | A1 * | 3/2011 | Lehmann ............. B29C 65/561 264/71 |
| 2011/0257694 | A1 * | 10/2011 | Mayer .................. A61B 17/686 606/86 R |

\* cited by examiner

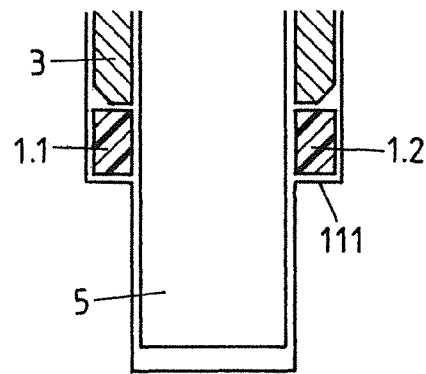
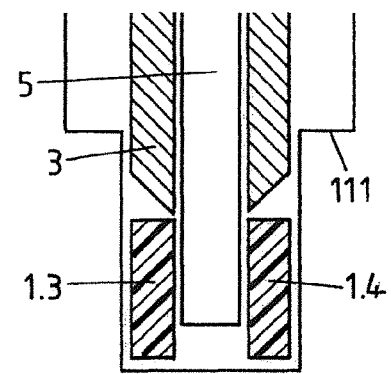
Fig. 7a  Fig. 7b
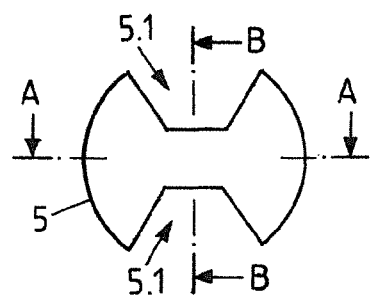
Fig. 7c
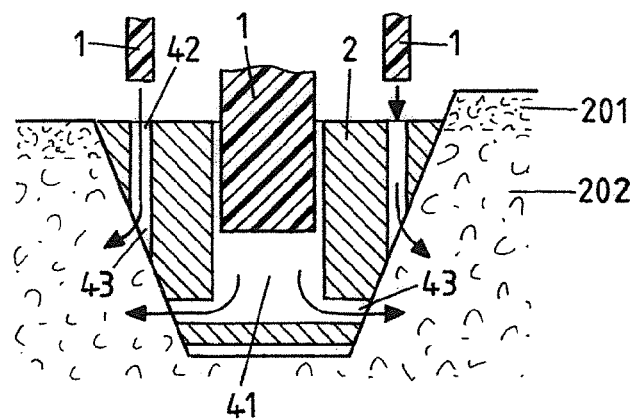
Fig. 8

METHOD AND DEVICE FOR REINFORCING AND/OR LINING MATERIAL

BACKGROUND OF THE INVENTION

Field of the Invention

The invention is in the fields of mechanical engineering, material science and construction, especially material engineering, building industry, timber construction, furniture industry and mechanical construction. In particular, it relates to methods and apparatuses for lining and/or reinforcing material.

Description of Related Art

If screws or other joining elements are anchored in material, especially porous material, for example, wood, composite (such as chipboard, particle board, oriented strand board etc.), cardboard, concrete, brick, plaster, stone (such as sandstone), sandwich structures comprising hard cover layers and a comparably softer filling between the cover layers, or industrial foam, often the problem of insufficient material stability or insufficient stability of the anchoring in the porous material arises. Especially, in composite materials, any load acting on the joining element is passed over to only few chips or particles or strands or pore walls, with adverse consequences both for the load bearing capability of the joining element-material connection and for its long-time stability. Similar problems arise when porous material are to be lined for other purposes than for a load bearing connection to a joining element, for example for making an electrically conducting and/or heat conducting connection to such a material.

SUMMARY OF THE INVENTION

It is an object of the present invention to provide methods and devices for providing porous-solid transitions.

Especially, it is an object to provide improved anchoring stability of screws or other joining elements in porous material. It is a particular object to provide a method of reinforcing material for later insertion of a joining element, such as a screw or a pin with thermoplastic material.

It is a further object to provide improved linings of porous material for load bearing or not load bearing connection of the material to a further part, such as a joining element for mechanically anchoring an item and/or for serving as an electricity and/or heat conductor.

It is yet a further object of the present invention to provide according devices.

In this text, the "term porous" material may generally refer to materials that have pores or man-made/machined or structurally defined cavities that are empty (filled by gas or a liquid only), such as foams. The term "porous" further also refers to materials that have a first, hard component and a second, softer component in pores of the first component, so that the second component is at least partly displaceable out of the pores and/or compressible in the pores if a localized pressure impinges on the porous material.

In this text, "joining element" generally refers to elements that are anchored in an object and/or that are connected to a surface portion of the object. It may serve for joining an other item to the object for mechanically, thermally and/or electrically contacting. It may additionally or alternatively serve for other functional purposes, such as marking, decoration, mounting, etc.

In accordance with a first aspect of the invention, a method and an according assembly of providing a porous-solid connection are provided.

In accordance with the method of the first aspect the reinforcing and/or lining method comprises the steps of:
providing an initial opening in a porous material;
providing a thermoplastic reinforcement and/or lining element and a tool;
placing the reinforcement and/or lining element in the initial opening, placing the tool in contact with an end face of the reinforcement and/or lining element and pressing the tool against the end face while energy is coupled into the tool and while a periphery of a liquefaction interface of the tool and the reinforcement and/or lining element is within the opening;
thereby liquefying thermoplastic material of the reinforcement and/or lining element at the liquefaction interface(s) to yield liquefied material;
causing portions of the liquefied thermoplastic material to penetrate into structures of the porous material;
allowing the liquefied thermoplastic material to harden and to thereby become reinforcement and/or lining material; and
removing the tool;
wherein at least one of the following conditions is fulfilled:
a. in at least one axial depth, the reinforcement and/or lining element is segmented as a function of the circumferential angle so that at this axial depth the circumferential wall of the initial opening in first regions is in contact with the reinforcement and/or lining element and in second regions is not in contact with the reinforcement and/or lining element;
b. in at least one axial depth of a resulting, lined opening, the reinforcement and/or lining material is caused to be segmented as a function of the circumferential angle;
c. in a resulting, lined opening, the reinforcement and/or lining material is provided in at least two reinforced regions axially spaced from each other, wherein between the two reinforced regions there is a non-reinforced region;
d. the reinforcement and/or lining element does not have the symmetry of a rotational cylinder but is asymmetric with respect to rotation around any axis;
e. the tool includes at least one radially protruding blade, protruding beyond an outer extension of the reinforcement and/or lining element (and possibly protruding beyond the circumferential wall of the initial opening into the porous material) and confining the flow of the liquefied thermoplastic material to certain azimuthal angles.

Also according to the first aspect of the invention, an assembly including the reinforcement and/or lining element and the tool is provided, the assembly being capable of carrying out the above-defined method.

In the present text, embodiments of the first aspect as well as of the hereinafter described second aspect are sometimes referred to as embodiments of segmented reinforcement and/or lining.

The initial opening may be a drilled or punched hole in the porous material or may have been made to the porous material by an other material removing step. Alternatively, the initial opening may have been provided in a material forming step, for example during shaping the object that comprises the porous material, for example by casting, moulding or any other material shaping process. In accordance with a further possibility, the initial opening may be made by the tool energized by mechanical vibrations, as explained in more detail hereinafter.

After removal of the tool, there will be a lined opening in the porous material, in which opening a mechanical joining element (such as a screw) or other joining element, for example a thermal and/or electrical contact may be anchored in a later step. The lined opening may correspond to the initial opening, with a potential slight reduction of the cross section due to reinforcement and/or lining material anchored in lateral walls of the initial opening. In alternative embodiments, further steps of modifying the initial opening may be part of the method so that the lined opening, at least in certain axial depths (especially at more proximal positions) has a larger cross section than the initial opening. In many embodiments, however, the lined opening will not be substantially larger than the initial opening.

In examples, the tool comprises a tool shaft and a distal broadening (foot) that forms a shoulder facing to the proximal side. A proximally facing surface of the shoulder may be pressed against a distal end face of the reinforcement and/or lining element by pulling the tool towards a proximal direction and/or pushing the reinforcement element against a distal direction while the energy is coupled into the tool. The liquefaction interface is then the interface between the distal end face of the element and the proximally facing surface of the broadening. In this, the reinforcement and/or lining element may be arranged at the periphery of the tool shaft, and it may encase the tool shaft at least in part. A counter element may then be used to exert a counter force while the tool is pulled and/or to push the reinforcement and/or lining element forward. Such a counter element may for example be formed like a bushing also encasing the tool shaft at least in part, or it may also have other shapes, for example the shape of a plate with a hole through which the tool shaft passes.

In other examples of the first aspect, an auxiliary element that may also serve as a counter element is used to guide the reinforcement and/or lining element and/or to exert a counter force. The auxiliary element may, for example, include a guiding shaft and a distal broadening (foot) that forms a shoulder facing to the proximal side so that a distal end face of the reinforcement and/or lining element may be pressed against the shoulder when the tool is pressed against the distal direction.

In the following, embodiments of the invention in which during liquefaction a tensile force is coupled into the tool and a counter force targeted towards a distal direction is coupled—for example by a counter element—into the reinforcement and/or lining element are sometimes referred to as 'rearward' configurations, while configurations in which the tool is pushed are 'forward' configurations.

In rearward configurations (this pertains to all embodiments and aspects), especially if the energy coupled into the tool is mechanical vibration energy, the tool may include a cable and a distal element attached to the cable, the distal element forming a proximally-facing coupling-out face that may interface with a distally-facing distal coupling-in face of the reinforcement and/or lining element. Such a configuration makes possible to reinforce and/or line an object also in situations where access with stiff tools would be difficult, and deflections of the mechanical energy become possible. Similarly, also radiation energy can be deflected in this manner, if the cable includes or forms at least one flexible radiation conductor.

In condition a., the second regions are substantial. For example at least 60°, or at least 100° or even at least 180° of the overall circumference is taken up by the second regions. Condition a. implies that the surface includes, in addition to first regions with reinforcement and/or lining material, also extended second regions without reinforcement and/or lining material.

In condition a., according to an option, the segmentation is such that it goes essentially along the full axial length of the reinforcement and/or lining element, i.e. there are circumferential angles that are free of reinforcement and/or lining material (or, where there is no contact between the circumferential wall and the reinforcement and/or lining element) along the full axial length. Especially, the reinforcement and/or lining element may include segments that are entirely separate from each other. Alternatively, such segments may be connected by bridge portions connecting them for example at the proximal end and/or the distal end. Such bridge portions may be chosen to be unsubstantial, i.e. the amount of material of the bridge portions may be chosen to be by far lower than the material between the bridge portions (for example less than 5% or less than 3% or 2% of the total amount).

In condition b. the distribution between reinforced and not reinforced regions along the circumference is determined by the method and the used devices, i.e. is systematic. This means that the used devices and/or the used method are chosen so that segmentation is achieved in a purposeful manner; in most cases (unless geometrical restrictions prevent this) the operator can influence where the reinforced and non-reinforced regions are finally to be by choosing an appropriate orientation around an insertion axis.

A method satisfying condition b. may be, according to a first possibility, achieved by using a segmented reinforcement and/or lining element according to condition a. In accordance with a second possibility, the initial opening that is made prior to the step of causing liquefied reinforcement and/or lining material to penetrate into the porous material, may have a geometry different from the geometry of the lined opening. The initial opening may, for example, have a different symmetry than the lined opening. The step of causing liquefied reinforcement and/or lining material to penetrate into the porous material may then include causing the liquefied material to penetrate into lateral walls of the initial opening, in a segmented or non-segmented manner. Subsequently to this step, a further (in addition to making the initial opening) material removing, for example drilling, step is made, in which porous material with reinforcement and/or lining material is removed, so that the lined opening satisfies condition b. For example, the reinforcement and/or lining element and tools used (such as a sonotrode and possibly a guiding element for the reinforcement and/or lining element) may have an according, non-circular symmetry.

The lined opening resulting after reinforcing may thus according to a first possibility be the initial opening porous material with the added reinforcement and/or lining material in the reinforced regions. In accordance with a second possibility, which can be combined with the first possibility, the resulting opening may be caused by drilling into the initial opening that has porous material provided with reinforcement and/or lining material. For example, the initial opening may be such as to not have rotational symmetry with respect to an opening axis, and after the process of pressing the reinforcement and/or lining material into the porous material, a further opening forming step (for example, a drilling step) may be made so that porous material with the reinforcement and/or lining material is removed in certain regions. The further opening forming step may be made by means of a tool that makes circular cylindrical bores, such as a drill.

Condition b. may for example be achieved either by a segmented sonotrode, by material removal in accordance with the second possibility above, or by other means such as using a plurality of reinforcement and/or lining elements and prior to or after forming the opening.

For condition c., the reinforcement and/or lining process, for example as described hereinbefore (with or without segmentation) or hereinafter, may be carried out at different axial depths. Alternatively, an auxiliary element having an opening accessible from the proximal side and with material exit holes may be used, wherein the material exit holes define the locations where the porous material is reinforced. Other variants are possible.

Axial segmentation in accordance with condition c. has the advantage that the reinforcement and/or lining process may be adapted to specific loading or load transfer conditions in the material and the location specific properties of the porous material.

According to another application of axial segmentation, two segmented regions axially spaced from each other may be used to accommodate a sealing element, such as an o-ring seal between them. The axial spacing of the segmented regions is then adapted to the dimensions of the o-ring seal; especially it is smaller than a diameter of the o-ring seal. In accordance with this application, especially, the diameter of the reinforced and/or lined sections of the opening is smaller than the diameter of the initial opening (and of the not reinforced and/or lined sections), i.e. a substantial amount of the reinforcement and/or lining material lines the interior of the opening after the process.

According to an even further application of axial segmentation (or also of circumferential segmentation) the reinforcement and/or lining material is chosen to be electrically conducting, for example by the polymer being provided with an appropriate filler. In this, then different segments may be used as different electrical contacts electrically isolated from each other by non-reinforced/lined sections or by sections that are reinforced/lined by an electrically insulating material.

In accordance with condition d., the reinforcement and/or lining element may especially have an outer contour shape (in a cross section perpendicular to the axis) that is essentially triangular, rectangular, star-shaped, etc. (all with rounded corners) etc. Circumferential segmentation (to satisfy condition b.) may be achieved by subsequently drilling, in accordance with the second aspect described hereinafter, a cylindrical hole, the drill having a diameter greater than a minimal outer diameter of the reinforcement and/or lining element but smaller than a maximal outer diameter of the reinforced material.

In condition e., the reinforcement and/or lining material obtains a slitted structure after the process due to the blades. Condition e. is especially favorable in rearward configurations where the tool is pulled during the reinforcement and/or lining process.

All of the conditions a.-d. can be combined with each other, i.e. ab, ac, ad, bc, bd, cd, abc, abd, acd, bcd, and abcd. In addition, combinations of all of these conditions and their combinations with condition e. are possible, i.e. ae, be, ce, de, abe, ace, ade, bce, bde, cde, abce, abde, acde, bcde, and abcde.

In accordance with a second aspect, the reinforcement and/or lining method of reinforcing porous material includes the steps of:

Providing at least one thermoplastic reinforcement and/or lining element;

Placing the reinforcement and/or lining element in contact with the porous material and causing mechanical energy to impinge on the reinforcement and/or lining element to liquefy at least portions of the reinforcement and/or lining element and causing liquefied reinforcement and/or lining material portions of the reinforcement and/or lining element to penetrate into the porous material;

Letting the liquefied reinforcement and/or lining material portions re-solidify;

Removing a portion of the porous material and of the re-solidified reinforcement and/or lining material, whereby a lined opening is obtained, the lined opening having surface portions of the porous material with the re-solidified reinforcement and/or lining material and having surface portions of the porous material without the re-solidified reinforcement and/or lining material.

The removing step may be made by a tool that makes circular cylindrical bores, such as a drill. Also not-cylindrical geometries by a milling tool or similar are possible.

In a first group of embodiments, prior to the step of causing liquefied reinforcement and/or lining material to penetrate into the porous material, an initial opening of a geometry different from the geometry of the lined opening is provided, the initial opening for example having a different symmetry than the lined opening. The step of causing liquefied reinforcement and/or lining material to penetrate into the porous material may then include causing the liquefied material to penetrate into lateral walls of the initial opening. For example, the reinforcement and/or lining element and tools used (such as a sonotrode and possibly a guiding element for the reinforcement and/or lining element) may have an according, non-circular symmetry.

The subsequent step of removing a portion of the porous material and of the re-solidified reinforcement and/or lining material then may divide the reinforcement and/or lining material into segments, the surface portions of the porous material without the re-solidified reinforcement and/or lining material being between the segments.

In a second group of embodiments, the reinforcement and/or lining element or a plurality of reinforcement and/or lining elements may be caused to be anchored in the porous material by a method as described in U.S. Pat. No. 6,913,666 or in U.S. Pat. No. 7,160,405 incorporated herein by reference in their entirety. For example, a plurality of essentially pin-like reinforcement and/or lining elements may be used. The reinforcement and/or lining elements are anchored at positions that are peripheral with respect to the later added lined opening. Thereafter, the lined opening is made, the lined opening for example being cylindrical or conical or having an elliptical or any other shape.

In embodiments of the first and/or second aspect, the initial opening and/or the final, lined opening may be stepped, i.e. its cross section may vary as a function of the depth, with a step-like dependency of the cross section on the axial position.

Embodiments of the first and/or second aspect of the invention may, as alternative or in addition to being suitable for the above-explained applications, provide the following advantage: A non-segmented reinforcement and/or lining with a contiguous, tube-shaped reinforcement and/or lining element would lead to a toroidal reinforcement and/or lining material distribution in the porous material. If subsequently a screw is screwed into the reinforced initial opening, the material will bear a substantial resistance, and this may lead to a torsional movement of the whole toroidal reinforcement and/or lining material ring within the porous material leading to a damage to brittle porous material. In contrast thereto, the segmented reinforcement and/or lining material can give way to some extent due to the residual elasticity of the porous material, and this will ease screwing in of the screw, while the additional stability provided by the reinforcement and/or lining can be benefited from.

In accordance with a third aspect of the invention, a method of reinforcing porous material is provided, which method comprising reinforcing the porous material after insertion of the screw or other joining element. To this end, after insertion of the joining element (for example, conventionally, by drilling a hole and thereafter pressing or screwing the joining element into the hole), at least one reinforcement and/or lining element is anchored, under the impact of energy, in the porous material to be in contact with the joining element. The joining element and the reinforcement and/or lining element may in accordance with a first possibility include structures so that they interlock after the process—for example one of the joining element and the reinforcement and/or lining element may include liquefiable material and the other may include structures into which the liquefiable material may penetrate to create a positive-fit connection. In accordance with a second possibility, the joining element and the reinforcement and/or lining element both include thermoplastic material so that the reinforcement and/or lining element is weldable to the joining element.

In accordance with the method of the fourth aspect, the reinforcement and/or lining method includes the steps of:
providing an initial opening in the porous material;
providing a thermoplastic reinforcement and/or lining element (for example being a sleeve with a sleeve wall), and further providing a tool (for example sonotrode) and an auxiliary element;
placing the reinforcement and/or lining element in the initial opening, the reinforcement and/or lining element at least partially encompassing a guiding portion of the tool or of the auxiliary element,
coupling a pressing force and energy into the tool and from the tool into the reinforcement and/or lining element while a portion of the reinforcement and/or lining element is within the opening and in contact with the porous material;
thereby liquefying material of the reinforcement and/or lining element to yield liquefied material;
causing portions of the liquefied material to penetrate into structures of the porous material and/or into structures of an element connected to the porous material;
allowing the liquefied material to harden and to thereby become reinforcement and/or lining material; and
removing the tool;
wherein at least one of the following conditions is fulfilled:
A. during the step of coupling a pressing force and energy into the tool, an outer protection element at least partially encompasses the tool and locally prevents the tool from being in contact with the porous material;
B. the reinforcement and/or lining element is generally sleeve-shaped and includes at least one indentation or hole in a sleeve wall;
C. during the step of coupling a pressing force and energy into the tool, in a telescoping region a portion of the tool encompasses a portion of the auxiliary element or a portion of the auxiliary element encompasses the tool, wherein the tool and/or the auxiliary element comprises/include at least one protrusion facing to the auxiliary element/tool, respectively, so that in the telescoping region a contact between the tool and the auxiliary element is prevented, except for the protrusion/protrusions;
D. during the step of coupling a pressing force and energy into the tool, the tool is pressed towards the distal direction, and wherein the tool includes a distal broadening forming an salient feature that prevents a contact between the tool and the porous material at locations proximally of the salient feature (i.e. the diameter of the tool is, except for the salient feature, reduced compared to the diameter of the initial opening);
E. prior to the step of coupling a pressing force and energy into the tool, the reinforcement and/or lining element is connected to the tool by an axial positive-fit connection, and during the step of coupling a pressing force and energy into the tool, the auxiliary element is pressed against a distal direction to activate the step of liquefying material of the reinforcement and/or lining element and to push portions of the liquefied material aside and into the structures of the porous material.

At least the following combinations of these conditions are possible and are further embodiments of the invention: AB, AC, ABC, BC, BD, BCD, CD, CDE, DE. In addition, in special configurations also BE, BCE, and BCDE are possible.

In this, as well as in the other aspects of the invention and as further explained hereinbelow, the energy may be coupled into the tool (and from there into the reinforcement and/or lining element) in the form of mechanical vibrations. If the energy is mechanical vibration energy, the tool is a therefore a sonotrode for coupling the mechanical vibrations and/or heat absorbed from these vibrations into the reinforcement and/or lining element.

Alternatively, the energy may be coupled into the tool by way of radiation (especially laser radiation) that is absorbed by the reinforcement and/or lining element. As yet another alternative, the energy may be mechanical energy different from mechanical vibration, for example rotation. As an even further alternative, the energy may be heat, for example directed to the reinforcement and/or lining element by heat conduction and/or by causing an electrical current to flow through the reinforcement and/or lining element while the latter includes electrically conducting material with a relatively high electrical resistance.

In condition A, the outer protection element may be a sleeve of a suitable material and having suitable surface properties to minimize friction between the tool and the protection element. Especially, it may be a thin sleeve, the material thickness being merely sufficient so that the protection element is dimensionally stiff. The protection element prevents the tool from being in contact with the porous material locally, at the place of the protection element. At other places, direct contact between tool and porous material may occur depending on the situation.

In condition A, optionally the protection element may include thread tapping functionality.

In condition B, the reinforcement and/or lining element may be generally sleeve-shaped but with the indentations, holes or the like being systematical weakenings. Due to these weakenings—that may be arranged as spaces adapted to the purpose of the reinforcement and/or lining element and/or dimensions/geometrical properties of the porous material to be reinforced—the reinforcement and/or lining material may be liquefied with less energy impact. Onset of liquefaction as a function of the power that impinges on the reinforcement and/or lining element is already at lower powers, so that less power is required to liquefy. In embodiments, the weakenings are grooves that are inclined with respect to a radial direction. The grooves define necks in the reinforcement and/or lining element material at which the liquefaction sets in when energy impinges. After liquefaction at the necks (or other weak points), the remaining pieces may be subject to a shear movement along the direction defined by the grooves. In embodiments, the grooves are such that the more proximal portions are pressed outwardly when the tool presses them towards the distal direction.

In embodiments of all aspects, the surface of the tool (for example sonotrode if the energy impinges through mechanical vibration) that is in contact with the reinforcement and/or lining element and through which the mechanical energy is coupled into the reinforcement and/or lining element may be generally flat (radial, i.e. perpendicular to the proximodistal axis) or may be tapered or have any other shape. A particularly advantageous combination is the combination of a reinforcement and/or lining element fulfilling condition B. with a flat tool contact face. One reason for this is that the design and handling of the tool is easier when the surface is flat, while the advantages of non-flat contact faces (namely, direct, targeted onset of liquefaction, displacement of the liquefied material into the porous material) can be achieved also if condition B. is fulfilled.

In condition C, in the telescoping region (where the tool and the auxiliary element are in sliding contact), the tool may include inward projections, such as (axial and/or circumferential) ridges, spheres, etc. In addition or as an alternative, the auxiliary element may include corresponding outward projections. Due to these projections, a volume (buffer volume) remains between the tool and the auxiliary element so that, with the exception of the protrusions, they do not touch each other. This reduces energy loss, noise (if the energy is mechanical energy, for example vibration energy) and heat, especially generated by friction, and thus increases the efficiency of the process. The protrusions may be such that liquefied material does not penetrate into the buffer volume. This may for example be ensured that any remaining gap between the tool and the auxiliary element at the interface to the reinforcement and/or lining element is small enough so that surface tension and heat flow induced quenching of the polymer prevents liquefied material from entering into such a gap. Typically, the upper limit for the gap size is 0.05 to 0.1 mm for polymer of low melt viscosity (e.g., amorphous, aliphatic polyester, liquid crystal polymer) or up to 0.2 mm for polymer with a higher melt viscosity (e.g. higher molecular weight polypropylen). The optimal gap width can be determined in simple size variation experiments.

From the above, it follows that it is often advantageous if the gap is smaller than 0.2 mm so that surface tension prevents liquefied material from entering into such a gap.

Especially, in an embodiment the tool includes an inwardly protruding distal circumferential ridge. In another embodiment, the tool and/or the auxiliary element includes a plurality of axial ridges or a plurality of micro-protrusions that may be calotte-shaped, conical or have other shapes, including identical and different shapes.

In condition D, the tool includes, in addition or as an alternative to the protrusions defined by condition C, at least one outward protrusion that keeps a body of the tool from getting in direct contact with the porous material. Especially, such outward protrusion may be located essentially at the distal end of the tool and at the interface to the auxiliary element to thereby prevent liquefied material from flowing back along the porous material instead of being pressed into the porous material.

Like in all other embodiments, the feature of condition D may be combined with a slanted distal tool surface.

In condition E, the positive-fit connection may, for example, be provided by an outer thread of the tool or by circumferentially running indentations onto which the reinforcement and/or lining material was cast during the manufacturing process. When proceeding in accordance with condition E., the operator may advance the auxiliary element into the distal direction, while the tool is held still, slowly retracted towards the proximal direction, or slowly moved into the distal direction also (slower than the auxiliary element).

Condition E features the first advantage that due to the configuration with the central tool and the peripheral auxiliary element, there is only minimal contact between the tool and the porous material surrounding the initial opening. It features the further advantage that the reinforcement and/or lining element is coupled to the tool. Therefore, if the energy is mechanical energy, the reinforcement and/or lining element is subject to the full (vibratory, rotational) movement—in contrast to configurations where the tool for example 'hammers' onto the reinforcement and/or lining element. This brings about an additional reduction of the noise caused, as well as of energy required for liquefaction. Also, in embodiments where the energy is not mechanical energy but for example radiation energy or heat, this direct contact may be advantageous, especially for optimizing the desired energy transfer into the reinforcement and/or lining element.

In addition or as an alternative, other measures for noise reduction may be taken. As an example, the material of the sonotrode and/or the auxiliary element may be chosen so that it may not form a resonating body but is—given the chosen frequencies and dimensions, to be considered as an essentially stiff body. An example of such a material is PEEK instead of a metal. Other examples include further high temperature melting polymers like Polytetrafluoroethylene (PTFE), polyimides, etc.

In accordance with a further, fifth aspect of the invention, a method of reinforcing porous material is provided, the method including the steps of:
  providing a tool or a counter element, the tool or counter element comprising a distal end with a piercing tip and/or a cutting edge;
  providing a thermoplastic reinforcement and/or lining element;
  placing the tool or counter element with the distal end in contact with the porous material and pressing the instrument or counter element against the porous material to force the tool or counter element into the porous material;
  placing the reinforcement and/or lining element in contact with a face of the tool or counter element, the face facing to the proximal side,
  holding the tool or counter element towards a proximal direction against the reinforcement and/or lining element while energy is coupled into the reinforcement and/or lining element;
  thereby liquefying material of the reinforcement and/or lining element to yield liquefied material;
  causing portions of the liquefied material to penetrate into structures of the porous material;
  allowing the liquefied material to harden and to thereby become reinforcement and/or lining material; and
  removing the instrument.

In this, during the step of pressing the tool or counter element against the porous material, simultaneously mechanical energy can be coupled into the tool or counter element, respectively.

In a first group of embodiments, the instrument (tool or counter element) with the distal end having a piercing tip and/or cutting edge is a tool that in the step of coupling energy into the reinforcement and/or lining element serves as the tool for coupling the energy into the reinforcement and/or lining element (i.e. the energy is coupled into the tool and from there into the reinforcement and/or lining element). The method then may include the steps of:
- providing a tool, the tool comprising a distal end with a piercing tip and/or a cutting edge;
- providing a thermoplastic reinforcement and/or lining element;
- placing the tool with the distal end in contact with the porous material and coupling mechanical energy into the tool and pressing the tool against the porous material to force the tool into the porous material;
- placing the reinforcement and/or lining element in contact with a face of the tool, the face facing to the proximal side,
- pulling the tool towards a proximal direction against the reinforcement and/or lining element while mechanical energy is coupled into the tool and while a periphery of a liquefaction interface of the tool and the reinforcement and/or lining element is in contact with (i.e., is adjacent to) porous material;
- thereby liquefying material of the reinforcement and/or lining element at the liquefaction interface(s) to yield liquefied material;
- causing portions of the liquefied material to penetrate into structures of the porous material;
- allowing the liquefied material to harden and to thereby become reinforcement and/or lining material; and
- removing the tool.

Thus, in accordance with these embodiments of the fifth aspect, the tool has two purposes: it is firstly used to make or enlarge the initial opening. Then, the tool is also used as energy source/energy transmitter.

For the forcing step and for the reinforcement and/or lining step (the step in which the tool is held against the reinforcement and/or lining element while energy is coupled into the tool to liquefy at least portions of the reinforcement and/or lining element), the vibration tool is coupled to a vibration source, in particular to a source of ultrasonic vibration (e.g., piezoelectric vibration generator possibly comprising a booster to which the tool is coupled) and the tool and is suitable for transmission of the vibration from the proximal tool end to the distal tool end. This may be done such that a tool face—that faces to the proximal side and in contact with the reinforcement and/or lining element forms the liquefaction interface—vibrates with a maximal longitudinal amplitude. It is possible also to activate the tool to vibrate in a radial or in a rotational direction.

For the reinforcement and/or lining step, it is preferable to work with a substantially constant output of vibrational power, i.e. with vibration (base vibration) of substantially constant frequency and amplitude, wherein the frequency is in the above named frequency range (preferably between 2 and 200 kHz, between 10 and 100 kHz, or between 20 and 40 kHz) and is a resonant frequency of the vibrating system, and wherein the amplitude is in the range of 10 to 50 µm, preferably 20-40 µm.

For the forcing step, in particular in cases in which the porous material is hard and provides a relatively high resistance, vibrational modes as known from e.g. vibration assisted cutting or punching are preferable. Such vibration modes usually include pulses of higher amplitude and possibly sharper profiles (e.g. rectangular profile or Dirac impulse) and are, for example, provided by modulating the amplitude of the base vibration to. e.g., form pulses of higher amplitude and preferably by also sharpening the input wave form as compared with the base vibration and by matching the system's resonance frequency. The so created pulses can include one or several wave cycles of the base vibration each, and can be periodic with a modulation frequency preferably in the range of 0.5-5 kHz or they can be generated stochastically (in amplitude and modulation frequency) but in any case in phase with the system's resonance frequency. A means for producing stochastically occurring pulses is, for example described in the publication U.S. Pat. No. 7,172,420 incorporated herein by reference. Therein, the higher amplitude of the pulses is preferably greater than the base vibration amplitude by a factor of between 2 and 10.

Alternatively, such pulses can be achieved by overlaying the base vibration or replacing it with a pulse excitation generated by a mechanical impulse generator (e.g. comprising a rotationally driven unbalanced mass or hammer). Therein, the higher amplitude of the pulses is preferably again greater than the base vibration amplitude by a factor of between 2 and 10 and the pulse frequency which may be regular in the region of 20 to 200 Hz and in particular lower than the lowest resonance frequency of the vibrating system (e.g., undesired flexural vibration of the sonotrode). The low pulse frequencies are particularly important if material liquefaction during the forcing step is possible but is to be prevented as best as possible.

If as described above two different vibration modes are to be used in the forcing and in the anchoring step, the vibration source to which the vibration tool is coupled during the two steps is to be equipped for selectively producing the two vibration modes and with switching means for switching the vibration source from one vibration mode into the other one. Alternatively, two different vibration sources may be used.

In a second group of embodiments, the instrument (tool or counter element) is a counter element, and in the step of coupling energy into the reinforcement and/or lining element, a separate tool is used that for example acts from the proximal side. If the energy coupled into the reinforcement and/or lining element, the sonotrode may be a ring sonotrode.

Also in embodiments of the second group of embodiments, in the step of pressing the counter element against the porous material, mechanical energy may be coupled into the counter element, for example vibration energy. The energy coupled into the reinforcement and/or lining element via the tool in the subsequent step may then either also be mechanical energy, for example vibration energy (in which case optionally the energy source may be reallocated between the steps) or may alternatively be an other kind of energy, for example radiation energy or heat.

Alternatively, the step of forcing the counter element into the porous material may be carried out manually without any further energy source.

The invention also concerns a kit of parts for carrying out the method according to its fifth aspect, the kit comprising the tool, the reinforcement and/or lining element and possibly a counter element.

In accordance with a sixth aspect of the invention, a method of reinforcing and/or lining an object including porous material is provided, the method including the steps of:

providing an initial opening in the porous material;
providing a thermoplastic reinforcement and/or lining element and a tool;
placing the reinforcement and/or lining element in the initial opening, placing the tool in contact with a face of the reinforcement and/or lining element and pressing the tool against the face while energy is coupled into the tool and while a periphery of a liquefaction interface of the tool and the reinforcement and/or lining element is within the opening;
thereby liquefying material of the reinforcement and/or lining element at the liquefaction interface(s) to yield liquefied material, causing a relative movement of the tool with respect to the reinforcement and/or lining element, and causing portions of the liquefied material to penetrate into structures of the porous material;
allowing the liquefied material to harden and to thereby become reinforcement and/or lining material; and
removing the tool,
wherein at the liquefaction interface a full cross section of the reinforcement and/or lining element is liquefied.

To this end, for example an outer diameter of the tool (at least in the region of the liquefaction interface, thus in rearward configurations the outer diameter of the distal broadening) may be chosen to approximately correspond to the inner diameter of the initial opening (for example, is equal or smaller by at most 10% or at most 5% or at most 3%) and/or to be (approximately) equal to or greater than the outer diameter of the reinforcement and/or lining element (for example, corresponds to it, or is larger, or is smaller by at most 7%, at most 4%, or at most 2%). Especially, the method may be carried out so that no portion of the reinforcement and/or lining element that was not liquefied at the liquefaction interface(s) remains in the object or connected thereto after removal of the tool.

The concept that the full cross section of the reinforcement and/or lining element is liquefied at the liquefaction interface(s) implies that the reinforcement and/or lining element is a consumable element—it—or at least an axial section of it—is used for being liquefied and displaced fully or at least partly by the tool. When a relative movement is imposed on the tool and the reinforcement and/or lining element (by pulling the tool backward and/or by pushing the reinforcement and/or lining element forward), the not liquefied portions of the reinforcement and/or lining element get accordingly shorter until either the entire reinforcement and/or lining element is consumed (and a further reinforcement and/or lining element can be fed to the arrangement) or the remaining, not liquefied portion of the consumable reinforcement and/or lining element is removed.

In other words, at least a (distal or proximal) portion of the reinforcement and/or lining element is continuously, over its full cross section (cross section at an angle, in most cases perpendicular to the movement axis), liquefied starting from the initial liquefaction interface; the axial extension of the consumed portion of the reinforcement and/or lining element corresponding to the relative movement of the tool and the element after onset of the liquefaction.

This concept of consuming an entire cross section of the reinforcement and/or lining element according to the sixth aspect may be applied to all embodiments of the other aspects of the invention, especially the first, second, fourth and fifth aspect.

In accordance with embodiments of all aspects of the invention, a device for deflecting mechanical oscillations is used to cause the sonotrode to oscillate.

In accordance with the first as well as with the second, third, fourth, fifth or sixth aspect of the invention, also a kit of parts/an assembly for carrying out the respective method is provided. The kits of parts include the tool, the reinforcement and/or lining element and (if used for the method) the auxiliary element, these items having properties described hereinbefore and hereinafter referring to the respective methods.

It is readily possible to combine features and embodiments of the different aspects with each other. Especially, embodiments of the forth aspect are advantageously provided with features/conditions that characterize the first, second and third aspects and vice versa. The first aspect also combines well with the second aspects, and in embodiments the method according to the third aspect may be applied in addition to (and subsequently to) the first and/or second aspect.

All of aspects 1-4 can be combined with the fifth aspect.
All of aspects 1, 2, 4, and 5 can combined with aspect 6, especially by being using the method according to aspect 6 for reinforcing and/or lining.

For all embodiments of aspects 1, 2, and 4-6 of the invention, the reinforcement and/or lining step may be followed by a subsequent step of inserting the joining element.

The joining element may, for example, in accordance with a first option, be/include a screw that has an outer thread. The thread may be self-cutting, or previously a thread cutter may be used. The thread engages with corresponding structures in the reinforced porous material.

In accordance with a second option, mechanical vibration energy or heat may be used to anchor the joining element in the reinforced and/or lined opening. To this end, in accordance with a first possibility, the joining element may include thermoplastic material weldable to the reinforcement and/or lining material. In accordance with a second possibility, the joining element may include a material that is not liquefiable by being brought to a temperature at which the reinforcement and/or lining material is liquid, and structure with pores, openings or the like capable of making a positive-fit connection with the reinforcement and/or lining material. The first and second possibilities can be combined with each other. Also it is possible to combine the first and second option, for example, by using a metallic screw with a porous surface as a joining element, whereby the thermoplastic lining and/or lining element may penetrate into the pores when the screw is inserted in a heated state, so that after cooling the screw is fixed by a positive-fit connection.

Further, the reinforcement and/or lining element may be provided with a locking structure for impeding at least one degree of freedom of movement of the introduced element relative to the object with the reinforced and/or lined opening. For example, the locking structure may include an axial groove with which a corresponding protrusion of the element may engage—so as to rotationally fix the element relative to the object (in this, the element may, for example, be an axle mounted in the object). In addition or accordance with an alternative, the structure may include a circumferential groove, into which a circlip of the element may engage to axially fix the latter. Other examples of such structures exist, including indentations without any symmetry.

Such locking structures may in accordance with an option be made during the process of reinforcing and/or lining. For example, in embodiments where the diameter of the reinforcement and/or lined opening is smaller than the diameter of the initial opening (i.e., the opening walls are lined with a substantial amount of reinforcement and/or lining material), an axial groove may be made by a radial protrusion of the tool that by the axial movement causes an axial groove of a cross section defined by the shape of the protrusion. Indentations that do not extend along the full axial length of the reinforcement and/or lining may be made by at least one extendible protrusion. A circumferential groove may for example be made by an axially segmented reinforcement and/or lining.

In accordance with an other option, which can be combined with the option of making such a locking structure during the process, is to use an accordingly pre-made reinforcement and/or lining element. To this end, it is also possible to have a hybrid reinforcement and/or lining element, i.e., a reinforcement and/or lining element that does not consist of thermoplastic material but that includes segments in which the thermoplastic reinforcement and/or lining material is reinforced by a not liquefiable (i.e. not liquefiable under the conditions that liquefy the thermoplastic reinforcement and/or lining material) material. The shape of this reinforcement is then chosen so that it does not impede the movement of the tool during and after the reinforcement and/or lining process.

Also other kinds of joining elements can be used, for example conventional dowels, pins, etc.

The invention according to all its previously mentioned aspects can, for example, be used for the following applications or combinations thereof:
  mechanical reinforcement of porous material and/or reinforced mechanical connections between such porous material and a joining element anchored therein;
  Making possible the contacting of (electrically not conducting) porous material in order to conduct electrical charges to and from the material, for example in catalysts, fuel cells, etc.; this includes selective contacting by electrical contacts electrically isolated from each other, as discussed hereinbefore;
  Making possible the contacting of porous material in order to conduct heat to and from the material, heat exchanger, cooling element, etc.

An especially interesting class of porous materials for which the method applies are foams, such as ceramic foams.

Further applications include the anchoring of a bushing in a lightweight building element or other composite material with portions of different mechanical strengths. In such elements, at the transition between softer and harder materials, the reinforcement and/or lining material may, for example, form a bulge underneath the harder material, which provides an additional anchoring effect, in the manner of a rivet. Even further applications include bearing bushes or sleeves, for connecting tubes with a heat exchanger that may for example include Aluminium fins.

An even further application of methods according to aspects of the invention is the provision of a feed through that is instantaneously sealed against the interior of the porous material.

In all aspects, energy that is used to liquefy at least portions of the thermoplastic material may be mechanical energy. An example of an especially suited energy form is mechanical vibration (or, synonymously, oscillation).

Mechanical vibration or oscillation suitable for devices and methods according to embodiments of the invention that include liquefaction of a polymer by friction heat created through the mechanical vibration has preferably a frequency between 2 and 200 kHz (even more preferably between 10 and 100 kHz, or between 20 and 40 kHz) and a vibration energy of 0.2 to 20 W per square millimeter of active surface. The vibrating element (tool, for example sonotrode) is, for example, designed such that its contact face oscillates predominantly in the direction of the element axis (longitudinal vibration) and with an amplitude of between 1 and 100 µm, preferably around 10 to 30 µm. Rotational or radial oscillation is possible also.

For specific embodiments of devices, it is possible also to use, instead of mechanical vibration, a rotational movement for creating the named friction heat needed for the liquefaction of the anchoring material. Such rotational movement has preferably a speed in the range of 10,000 to 100,000 rpm.

A further way for producing the thermal energy for the desired liquefaction includes coupling electromagnetic radiation into the reinforcement and/or lining element and/or into an element in a vicinity thereof in direct or indirect heat conducting contact with the reinforcement and/or lining element. Especially, a light conductor may be used for this purpose. The light conductor may, for example, be a tube-shaped transparent light conducting tool, for example a hollow cylinder of glass or an other (for example plastic) material that is transparent and has a sufficiently high index of refraction for the used radiation (for example visible or infrared laser radiation).

In this, absorption preferably takes place within the reinforcement and/or lining material to be liquefied or in the immediate vicinity thereof. Depending on the requirements and the set-up the radiation therein may be absorbed at different places:
  a. in accordance with a first variant, the distal end of the tool may be provided with an absorbing coating or surface so that the distal end of the tool—that interfaces with the reinforcement and/or lining element—is heated, so that the generated heat causes the reinforcement and/or lining element to be liquefied at the interface to the tool.
  b. in accordance with a second variant, the reinforcement and/or lining element is so as to at least partially absorb the radiation. If the reinforcement and/or lining element strongly absorbs the radiation (for example by having a high concentration of a pigment or other absorber or in that the polymer itself absorbs the radiation), absorption will primarily take place at the interface to the tool. In case of weaker absorption (if, for example, the reinforcement and/or lining element has a polymer composition that is transparent for the radiation and a low concentration of absorbing pigments), then absorption will be distributed through at least a part of the length of the reinforcement and/or lining element. Then the tendency will be that after the radiation sets in some time passes until liquefaction starts, but then a substantial portion of the material will be softened already. For special applications, it is possible to have a pre-determined distribution of absorbing pigment in the reinforcement and/or lining element. Instead of a pigment or an absorbing polymer or in addition thereto, absorption can be caused by at least one of surface roughness, micro- or nanosized fillers like glass beads, fumed silica, calcium carbonate, glass fibers, nanotubes, graphite, etc.)
  c. In accordance with a third variant, the reinforcement and/or lining element is also transparent, and the counter element includes an absorbing surface, so that the radiation is primarily absorbed at the interface between the counter element and the reinforcement and/or lining element. In this variant, the step of coupling energy into the reinforcement and/or lining element and simultaneously applying a force often includes advancing the counter element towards the proximal direction while the tool may for example be held still.

Instead of providing the tool in the form of a radiation conductor, or in addition thereto, it is also possible to include a miniature laser (such as a laser diode or an arrangement of laser diodes) directly in the tool.

As an even further alternative to providing the tool in the form of a radiation guiding cylinder, the tool may include any other radiation directing arrangement. This includes the possibility of directing the radiation to a distal foot and causing it to impinge on the reinforcement and/or lining element from the distal side in a "rearward" configuration. For the purpose of radiation directing, the tool may include appropriate means like integrated fiber radiation conductors, mirroring faces, etc.

Preferably, electromagnetic radiation in the visible or infrared frequency range is used, wherein the preferred radiation source is a corresponding laser.

In specific embodiments that include radiation as energy source, parameters and material combinations may be parameters and material combinations known from laser welding of thermoplastics. Further embodiments may use parameters/materials known from methods of joining together or joining with a thermoplastic surfaces of wood or wood composite materials or other porous materials, possibly with the aid of a thermoplastic. Examples of teachings include US 2003/0159294 (Whittenbury), U.S. Pat. No. 7,727,658 (Enjoji et al.), US 2005/0042456 (Krause et al.), US 2002/0056707 (Pinho et al.), or U.S. Pat. No. 8,314,359 (Bovatsek et al., referring to ultrashort pulses), the teachings of all of which are incorporated herein by reference Also the following sources provide useful information:

Dirk Herzog, "Laserdurchstrahlschweissen von Holzwerkstoffen und thermoplastischen Polymeren", Dissertation Gottfried Leibnitz Universität Hannover, 2008 (concerning laser beam welding; especially pages 7-12, pages 14 et seq. for material combinations; chapter 2.6.3 page 33 (choice of laser); pages 50 et seq., 65, 75 et seq.

Leo-Alexander von Busse, "Laserdurchstrahlschweissen von Thermoplasten: Werkstoffeinflüsse und Wege zur optimierten Prozessführung" Dissertation Universität Hannover, 2005, published with ISBN 3-936888-90-6, (especially chapter 7 for the relevance of polymer modification)

Jörn-Eric Schulz, "Werkstoff-, Prozess-und Bauteiluntersuchungen zum Laserdurchstrahlschweissen von Kunststoffen", Dissertation Rheinisch-Westfälische technische Hochschule Aachen, 2002/2003, especially chapter 4.

The teachings of all of these references are incorporated herein by reference.

According to an even further alternative, the energy may be supplied to the system by way of electric heating of one of the device parts.

a. According to a first possibility, the tool may include a resistance heater in immediate vicinity to the reinforcement and/or lining element, for example directly at the interface. (or, the resistance heater itself may be at some distance to the interface, and the tool includes a heat conductor from the resistance heater to the interface.

b. In accordance with a second possibility, the tool may include an electrode at the interface to the reinforcement and/or lining element, the reinforcement and/or lining element is a poor electrical conductor, and some other element—for example, the auxiliary/counter element or, if available, a protective sheath element or other—includes a further electrode so that electricity is conducted through the reinforcement and/or lining element and thereby heats the latter. The arrangement of the electrodes in this may influence the location of primary heating.

In this text, the expression "thermoplastic material being liquefiable, e.g., by mechanical vibration" or in short "liquefiable thermoplastic material" or "liquefiable material" or "thermoplastic" is used for describing a material including at least one thermoplastic component, which material becomes liquid or flowable when heated, in particular when heated through friction, i.e., when arranged at one of a pair of surfaces (contact faces) being in contact with each other and vibrationally or rotationally moved relative to each other, wherein the frequency of the vibration is between 2 kHz and 200 kHz, preferably 20 to 40 kHz and the amplitude between 1 μm and 100 μm, preferably around 10 to 30 μm. Such vibrations are, for example, produced by ultrasonic devices such as, for example, is known from ultrasonic welding. For being able to constitute a load-bearing connection to the porous material, the material has an elasticity coefficient of more than 0.5 GPa, preferably more than 1 GPa. (The material property values mentioned in this text generally refer to room temperature (23° C.) unless referring to temperatures or defined otherwise in this text).

Specific embodiments of materials are: Polyetherketone (PEEK), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material may also include a suitable filler, for example reinforcing fibers, such as glass and/or carbon fibers. The fibers may be short fibers, long fibers or continuous fibers.

The fiber material (if any) may be any material known for fiber reinforcement, especially carbon, glass, Kevlar, ceramic, e.g., mullite, silicon carbide or silicon nitride, high-strength polyethylene (Dyneema), etc.

Other fillers, not having the shapes of fibers, are also possible, for example powder particles.

However, in applications where no load bearing capacity is required (i.e. processes where the required capability of transferring stress is below 5 MPa or below 1 MPa), the thermoplastic material may also be substantially softer. Especially, due to the liquefaction taking place directly at the interface between the tool and the reinforcement and/or lining element, no mechanical energy has to be transmitted through the element itself. Thus, during the process and thereafter (thus also generally at the temperature at which it is used, for example room temperature) it may be comparably soft. In other words, the advantages of an elasticity coefficient of at least 0.5 GPa do not apply or are at least not pronounced in these systems.

For applications with no or reduced load bearing capacity requirements (for example below 5 Mpa) even elastomer materials for the reinforcement and/or lining materials may be used, these materials having, for certain applications, advantages in terms of damping properties—for example for vibrating or acoustical (acoustically isolating) connections.

In the case of a thermoplastic matrix material, the processes according to aspects of the invention may be used even if the filler material makes up as much as up to 80% or 85% (Vol.-%) of the reinforcement and/or lining material, which makes the processes suitable also for materials for which injection molding is not possible. Despite high filling grades, the material remains well capable of flowing.

If the liquefiable material is to be liquefied not with the aid of vibrational energy but with the aid of electromagnetic radiation, it may locally contain compounds (particulate or molecular) which are capable of absorbing such radiation of a specific frequency range (in particular of the visible or infrared frequency range), e.g., calcium phosphates, calcium carbonates, sodium phosphates, titanium oxide, mica, saturated fatty acids, polysaccharides, glucose or mixtures thereof.

The material of the tool (for example, sonotrode) and/or the material of the auxiliary element may be any material that does not melt at the melting temperatures of the liquefiable material. Especially, the tool and/or the auxiliary element may be of a metal, for example a titanium alloy. A preferred material is titanium grade5. This material, in addition to being generally suited for anchorable devices, has a comparably low heat conduction. Because of this bad heat conduction, the melting zone arising in liquefiable material and at the interface to the directing structure is heated quickly, without the surroundings being heated to too high temperatures. Alternative materials for the tool and/or the auxiliary element are other metals like other titanium alloys, stainless steel, low damping, temperature and abrasion resistant Fe, Ni or Co-base alloys, ceramics like Zirconium oxides or Aluminum oxides, Siliconnitrides or Siliconcarbides, or hard plastics such as PEEK etc. To optimize abrasion resistance towards damping behavior and toughness, parts of the tools that interact directly with abrasive, i.e. highly ceramic or metal powder filled thermoplastics, can be made of ceramics. Possibly but not necessarily in combination with this, the elongated sonotrode shaft can be made of a minimally damping metal alloy or amorphous metal (metal glass).

BRIEF DESCRIPTION OF THE DRAWINGS

In the following, ways to carry out the invention and embodiments are described referring to drawings. The drawings mostly are schematic. In the drawings, same reference numerals refer to same or analogous elements. The drawings show:

FIG. 2a-8 arrangements comprising a tool (namely, a sonotrode), a reinforcement and/or lining element and/or an auxiliary element for segmented reinforcement and/or lining;

DESCRIPTION OF THE PREFERRED EMBODIMENTS

Figure 1:
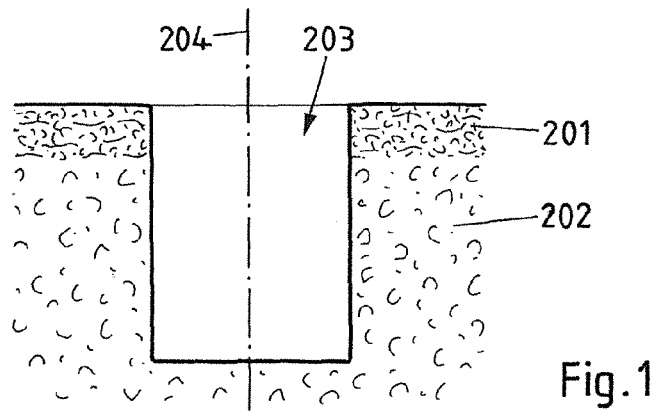
FIG. 1 porous material with an initial opening.

FIG. 1 shows a portion of porous material, for example of a board of a composite or sandwich material. The depicted porous material includes a top layer of comparably dense and hard covering material 201, for example, laminated onto less dense composite porous material 202. An initial opening 203, in which a joining element—such as, for example, a screw or a pin—is to be anchored, has, for example, been made by drilling. Alternatively, the initial opening 203 may have been pre-processed during the building object manufacturing process. An opening axis 204 is shown. In case the opening is made by drilling, the opening may have rotational symmetry with respect to the axis 204. Because of the relatively low mechanical load resistance of the brittle composite porous material, it is desirable to improve the mechanical stability of the porous material prior to the anchoring of the joining element.

In accordance with the fifth aspect of the invention, an initial opening 203 is made by a set-up in which a vibrating tool (sonotrode) or a counter element is also used as hole forming instrument.

Figure 1A:
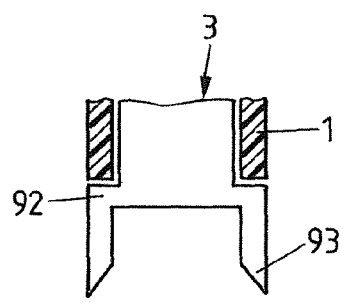
FIGS. 1a and 1b distal portions of opening forming sonotrodes.
Figure 1B:
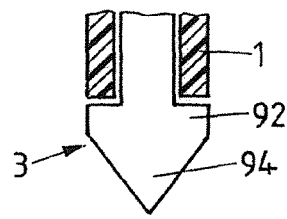

Referring to FIGS. 1a and 1b, firstly the option of using the tool (for example, sonotrode) as hole forming element is discussed. For the purpose of forming the initial opening 203, the forward (distally) facing portions of the sonotrode are accordingly shaped. During introduction of the tool, the tool is forced into a distal direction while vibrations are coupled into the tool, wherein the parameters of the vibration are chosen to cause the distal end of the sonotrode to be forced into the porous material to cause an opening that is cylindrical or that in cross section is ring-shaped. This may be combined with a subsequent reinforcement and/or lining step in a 'rearward' configuration in which the sonotrode includes a proximally facing coupling face, in which the liquefaction interface is at a distal end of the reinforcement and/or lining element and in which the sonotrode is pulled during the process, as, for example, described for some embodiments hereinafter. More specifically, after the forcing step is finished, the sonotrode is again subject to mechanical oscillations—with accordingly adapted energy and other parameters—while it is retracted. At this time, proximally of the most distal sonotrode portion a reinforcement and/or lining element is placed and is at least in part liquefied by the simultaneous retraction and vibration energy impact.

FIGS. 1a and 1b show an example of distal portions of a sonotrode 3. The distal portions include a distal broadening that forms a shoulder that is pressed against the reinforcement and/or lining element 1 in the reinforcement and/or lining step in which the sonotrode is subject to a pulling force, and the interface between the sonotrode (or, more in particular, the shoulder) and the reinforcement and/or lining element serves as the liquefaction interface. The distally facing portions of the sonotrode are equipped with a cutting edge 93 (FIG. 1a) and/or with a piercing tip 94 (FIG. 1b). Configurations with a piercing tip 94 are especially suited in situations where the porous material is very weak and/or has little density and/or the diameter of the opening is comparably small.

In accordance with a second option, the instrument by which the initial opening is made or extended is not the tool that is later used for coupling the energy required for liquefaction into the reinforcement and/or lining element, but is the counter element for applying the counter force (in a forward configuration where the tool is held towards a distal direction while energy is coupled into the reinforcement and/or lining element for liquefying material of it). The counter element 2 in this may be shaped, for example, like shown in FIG. 1a, FIG. 1b and described hereinbefore referring to the tool.

For the step of forcing the counter element into the porous material, optionally mechanical vibration or rotation may be coupled into the counter element. For the subsequent step of coupling energy into the reinforcement and/or lining element, the vibration source or source of the rotational movement may be reassigned to the tool, or another corresponding source may be used.

Alternatively, the step of forcing the counter element into the porous material may be carried out manually without any further energy source.

In embodiments according to the second option, the energy coupled into the reinforcement and/or lining element may as an alternative to mechanical energy also be radiation and/or heat.

Referring to the following figures, methods of reinforcing porous material of, for example a configuration as shown in FIG. 1, are described. With reference to following FIGS. 2-8, embodiments of segmented reinforcement and/or lining are described.

Figure 2A:
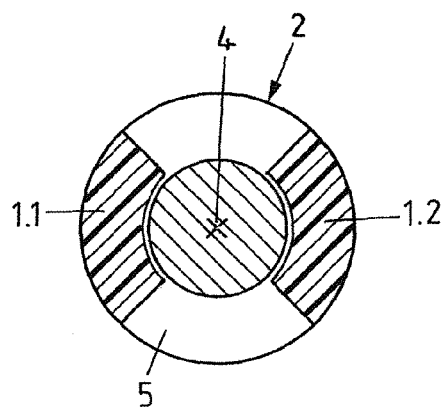
Figure 2B:
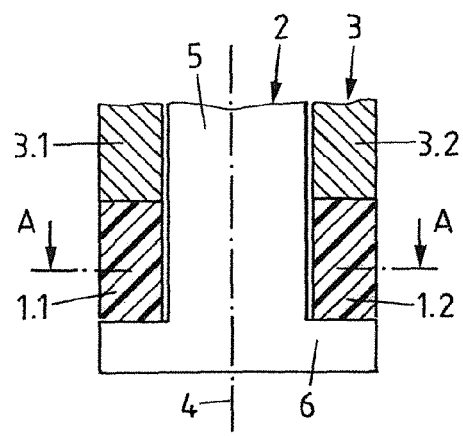
Figure 2C:
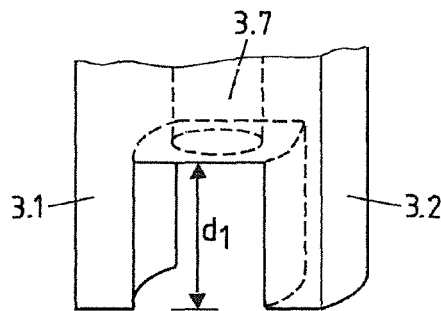
Figure 2D:
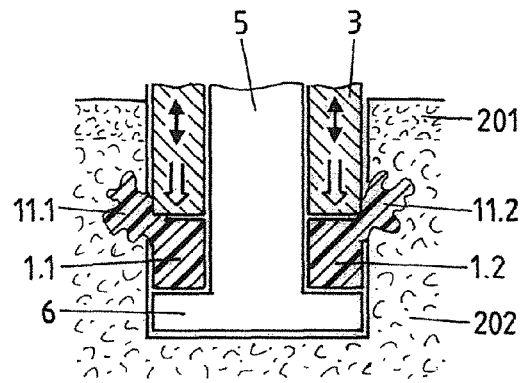
Figure 2E:
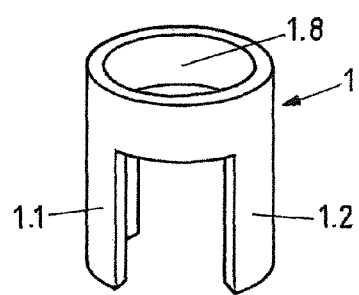
Figure 2F:
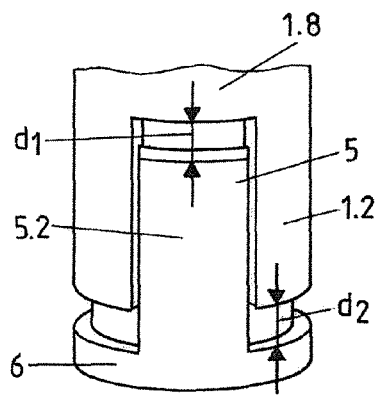
Figure 2G:
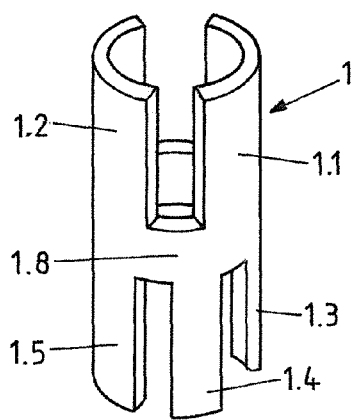

A first example of an assembly for circumferential segmentation is depicted, in sections along different planes, in FIGS. 2a and 2b. FIG. 2c shows a view of the sonotrode 3 of the assembly, FIG. 2d shows a schematic view of the assembly in section in the initial opening during the process, FIG. 2e shows a variant of a reinforcement and/or lining element, FIG. 2f shows the reinforcement and/or lining element of FIG. 2e together with a specially adapted auxiliary element, and FIG. 2g shows yet another reinforcement and/or lining element. FIG. 2a shows a cross section in plane A-A of FIG. 2b.

The embodiments with deep ranging reinforcement and/or lining element, for example the embodiment shown in FIG. 2e, may be especially suitable for the thermal and/or electrical connection of weak conductors, for example of a ceramic foam in a fuel cell.

The assembly includes a reinforcement and/or lining element 1 that has two separate reinforcement and/or lining element portions 1.1, 1.2, a tool (sonotrode) 3, and an auxiliary element 2 serving as counter element. The auxiliary element forms a guiding shaft 5 and a distal broadening 6 that forms a shoulder so that the reinforcement and/or lining element is capable of being compressed between the sonotrode 3 and the shoulder 6 during the process. The guiding shaft in the depicted embodiment in other word forms part of a counter element that in addition to the guiding element shaft includes a distal broadening 6 with proximally (rearwardly) facing counter element contact faces through which a counter force is coupled into the reinforcement and/or lining element portions. The counter force is a force of equal magnitude but opposite direction to the force by which the sonotrode is pressed against the reinforcement and/or lining element portions.

The guiding shaft 5 does not have the shape of a rotational cylinder but is circumferentially structured to include two axial grooves in which the two reinforcement and/or lining element portions 1.1, 1.2 are placed. The sonotrode 3 is correspondingly segmented to include two pushing portions 3.1, 3.2 with a cross section approximately corresponding to the cross section of the reinforcement and/or lining element portions 1.1, 1.2. The sonotrode also includes a central cannulation 3.7 for the shaft portion 5 of the auxiliary element 2.

In alternative embodiments, the auxiliary element may lack the distal broadening and merely be a guiding pin. In these embodiments, the counter force opposite to the sonotrode pressing force may be exerted by the porous material against which the reinforcement and/or lining element is pressed, or an adhesion and/or friction force by which the reinforcement and/or lining element portions adhere to the guiding element, or a combination thereof. In addition or as an alternative, it is also possible to provide the shaft and the reinforcement and/or lining element with surface structure engaging with each other, such as small indentations of the shaft into which corresponding inner protrusions of the reinforcement and/or lining element protrude.

The segmentation of the reinforcement and/or lining element as illustrated with respect to FIGS. 2a and 2b may be over the full axial length of the reinforcement and/or lining element portions, or it may be partial, i.e. the segmentation my be restricted to certain axial positions whereas in other axial positions the reinforcement and/or lining element may include a portion 1.8 that surrounds the guiding shaft, so that the reinforcement and/or lining element is one-piece. A first example is shown in FIG. 2e, where the shaft surrounding portion 1.8 is at the proximal end of the reinforcement and/or lining element. By the construction of the reinforcement and/or lining element shown in FIG. 2e, towards the distal end of the reinforcement and/or lining element there are open gaps between the element portions 1.1, 1.2. This may optionally be combined with an auxiliary element having a distal end that has projections 5.2 as illustrated in FIG. 2f that prevent liquefied portions of the thermoplastic material to be spread into circumferential directions and. More in particular, the dimensions of the open gaps and the projections 5.2 may be adapted to each other so that the distance $d_1$ is smaller than or approximately equal to the distance $d_2$.

Yet another embodiment of a reinforcement and/or lining element with portions 1.1-1.5 held together by a shaft surrounding portion 1.8 is shown in FIG. 2g. In this embodiment, the shaft surrounding portion is in an axially central position. Also the embodiment of FIG. 2g may optionally be used together with an auxiliary element of the kind depicted in FIG. 2f.

In FIG. 2b also a proximodistal axis 4 is depicted. In the configuration of FIGS. 2a-2g, the elements 1, 2, 3, of the assembly do not have circular symmetry around this axis.

For carrying out the method with segmented reinforcement and/or lining, the assembly of FIGS. 2a and 2b is placed in the initial opening with the axis 4 approximately parallel to the opening axis 204. Then the sonotrode 3 is pressed towards the distal side while mechanical oscillations are coupled into the tool and while the auxiliary element is held against the pressing force so that the reinforcement and/or lining element is compressed between the vibrating sonotrode and the auxiliary element. The vibration energy is chosen to be sufficient so that a melting process of the thermoplastic auxiliary element material sets in the forward movement of the sonotrode (and/or the rearward movement of the auxiliary element) causes the molten thermoplastic material to be pushed aside and into structures of the surrounding porous material. This is illustrated in FIG. 2d. The displaced thermoplastic material portions 11.1, 11.2 re-solidify and thereby reinforce the porous material. The process is, for example, continued until all reinforcement and/or lining element material has been liquefied and displaced and until the distal end faces of the pushing portions abut against the shoulder 6 formed by the distal broadening.

Because the reinforcement and/or lining element is segmented, i.e. includes two reinforcement and/or lining element portions at different angular positions with respect to the proximodistal axis, the thermoplastic material portions 11.1 remain separate and form two reinforcement and/or lining regions.

Whereas, referring to FIGS. 2a-2d, circumferential segmentation of the reinforcement and/or lining element has been described referring to a configuration to reinforce a circular hole and using two segmentation element portions in a symmetrical arrangement, various other embodiments are possible. For example, the two segmentation element portions need not be arranged symmetrically with respect to a symmetry plane as the illustrated embodiment, but other, asymmetrical arrangements are possible. Further, more than two segmentation element portions may be used (as, for example, in the lower part of the reinforcement and/or lining element of FIG. 2g), for example three, four, five, six or even more—all in a symmetrical or asymmetrical arrangement. Also, the reinforced initial opening need not be circular but can have any other shape.

Figure 3A:
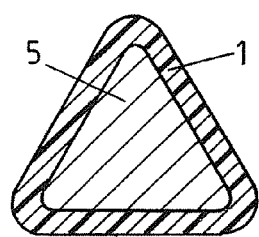
Figure 3B:
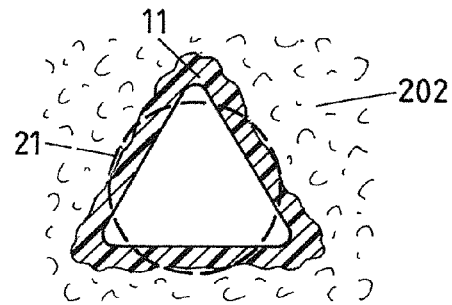
Figure 3C:
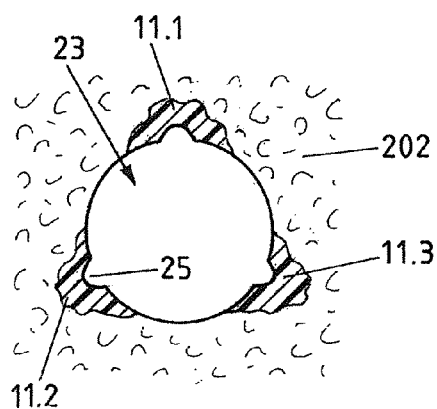
Figure 3D:
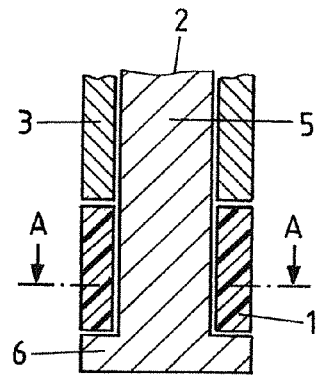
Figure 4:
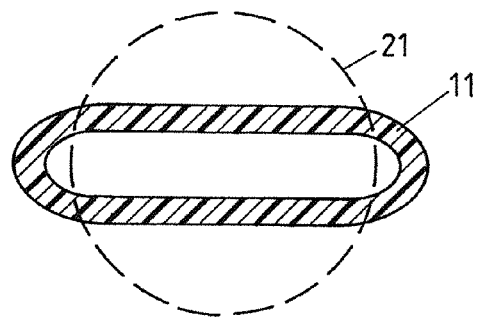

A further example of segmented reinforcement and/or lining is described referring to FIGS. 3a-4. This example uses the insight that the reinforcement and/or lining process does not rely on circular symmetry of the opening to be reinforced. Rather, it is possible for mechanical energy capable of liquefying the thermoplastic reinforcement and/or lining element also in non-circular arrangements.

An arrangement comparable to the one of FIGS. 2a-2d or a variant like in FIG. 2e/2f or 2g may also serve as a "rearward" embodiment. If the element 2 with the shaft 5 and the distal broadening 6 is used as a sonotrode coupled to a vibration generator and the bushing 3 is used as a counter element, the liquefaction interface is the interface between the distal broadening 6 and the reinforcement and/or lining element/lining element portions 1; 1.1, 1.2.

In this variant, like in the other embodiments relying on a "rearward" configuration, during the process, the counter element is held against the reinforcement and/or lining element 1 while a tensile force and mechanical vibrations are coupled into the sonotrode. The sonotrode may then be slowly pulled back while the counter element is held still or advanced forward or possibly slowly retracted but slower than the sonotrode. The thermoplastic material that is liquefied at the liquefaction interface is continuously displaced into the pores of the material to be reinforced and/or lined.

FIG. 3a shows, in cross section along plane A-A in FIG. 3d, a guiding shaft 5 of an auxiliary element, and a reinforcement and/or lining element 1 surrounding the guiding shaft 5 of. The guiding shaft and the reinforcement and/or lining element have a translational symmetry along the proximodistal axis and a generally triangular shape in cross section. The sonotrode 3 is proximal of the reinforcement and/or lining element and has a portion with a similar shape.

For reinforcement and/or lining, in a first step, the assembly of FIGS. 3a and 3d is placed in the initial opening. Then the sonotrode 3 is pressed towards the distal side while mechanical oscillations are coupled into the tool and while the auxiliary element is held against the pressing force so that the reinforcement and/or lining element is compressed between the vibrating sonotrode and the auxiliary element and so that at the interface between the sonotrode and the reinforcement and/or lining element the thermoplastic material of the reinforcement and/or lining element starts melting and is displaced into the surrounding porous material. The result is illustrated, again in section, in FIG. 3b. The initial opening, that is triangular in cross section, is surrounded by a reinforced region where the porous material is interpenetrated by the reinforcement and/or lining material 11. The dashed line 21 in FIG. 3b shows where in a next step a bore is added. The bore 23 has a circular cross section and is thus suitable for anchoring, in a subsequent step (not shown) a screw. When the bore is made, further porous material, as well as regions of the reinforcement and/or lining material are removed. What remains (FIG. 3c) is porous material that is reinforced in the regions where the reinforcement and/or lining material is not removed. FIG. 3c illustrated three separated reinforcement and/or lining material portions 11.1, 11.2, 11.3. The lobes 25 that may optionally remain at the edges of the initial opening may add further flexibility and may soon after anchoring of the screw (or other joining element) be filled by porous material.

Also for the embodiment of FIG. 3 there exists a "rearward" configuration variant if the element with the distal broadening 6 is used as a sonotrode coupled to a vibration source and the bushing-like element 3 is used as a counter element; the liquefaction interface then being the interface between the distal broadening and the reinforcement and/or lining element.

As an alternative to being triangular, the initial opening and the reinforcement and/or lining element in variants of this group of embodiments may have other non-circular cross sections. An example of such an alternative is illustrated in FIG. 4, schematically in section perpendicular to the proximodistal axis. The initial opening and the reinforcement and/or lining element 1 have a generally elongate cross section, so that after reinforcement and/or lining and adding the bore (dashed line 21) two reinforced regions will remain. Various other non-circular shapes are possible, both, symmetric and asymmetric. In particular, it is possible to adapt the shape to the anatomy of the place where the joining element is to be anchored.

The approach of FIG. 4 can be implemented both in forward configurations with a sonotrode 3 that is pushed during the reinforcement and/or lining process (as illustrated in FIG. 3d) and in "rearward" configurations of the mentioned kind in which the sonotrode is pulled. In "rearward" configurations, further in accordance with the sixth aspect, the sonotrode may optionally have a cutting distal edge that allows manufacturing the initial opening by introduction of the sonotrode while mechanical energy is coupled into the sonotrode.

Figure 5A:
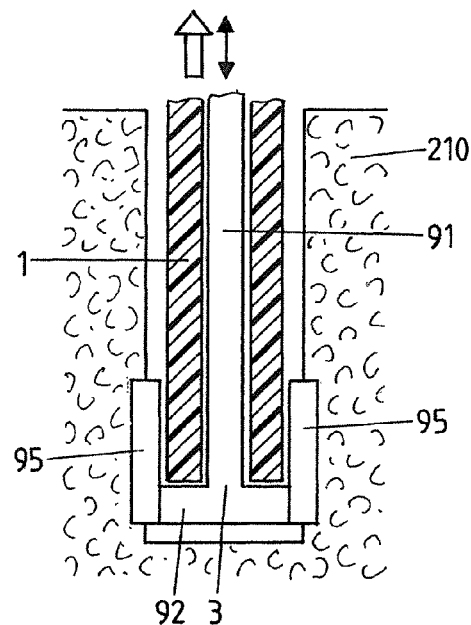
Figure 5B:
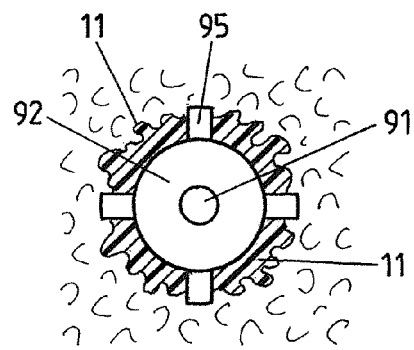

A further example of a "rearward" configuration is illustrated in FIGS. 5a and 5b. FIG. 5a shows a configuration at the onset of the liquefaction process in section, and FIG. 5b shows a schematic illustration, corresponding to a horizontal section, of the effect of the blades that divides the reinforcement and/or lining material 11 into sections. In this example, the material 210 to be reinforced and/or lined is shown without a hard covering material. The material may, for example, be a ceramic or metallic foam or a wood composite material or a weak or brittle material. Generally, the teaching of all embodiments of this document applies to all different kinds of porous material in the sense of the present text—unless specifically taught to be for special material combinations.

In the embodiment of FIGS. 5a and 5b, the reinforcement and/or lining element 1 has the shape of a cylindrical bushing, i.e. is tube-shaped. The sonotrode includes a sonotrode shaft 91 and a distal broadening 92. At the periphery of the distal broadening, the sonotrode further includes a plurality of blades that protrude radially. In the depicted configuration, the blades protrude further than the radius of the (cylindrical) circumferential wall of the initial opening and thus protrude into the material 210. If the material quality (hardness, toughness) allows so, the blades may cut into the material 210. Alternatively, the initial opening may have been provided with radial indentations for the blades. The blades restrict the flow of liquefied material in azimuthal directions and thus cause the presence of sectors of the thermoplastic reinforcement and/or lining material. Especially, the blades may be dimensioned to penetrate as far into the material 210 as the maximum extension of the expected radial flow of the reinforcement and/or lining material.

The counter element is proximally of the reinforcement and/or lining element and not shown in FIG. 5*a*; the counter element alternatively to being tube-shaped may also be a plate with a hole for the sonotrode shaft; the plate for example configured to rest against the surface of the material 210.

The elements in FIGS. 5*a* and 5*b* have are illustrated to have, with the exception of the blades, the symmetry of a rotational cylinder, i.e. the initial opening is a (rotational) cylindrical bore. Also, in the illustrated configuration the tool has four blades arranged equally spaced. However, the concept of the tool (sonotrode) comprising blades can be applied to other concepts. Generally, the initial opening, the reinforcement and/or lining element and the distal broadening may have any cross section, for example elliptical, triagonal, rectangular, etc. Also in these embodiments, the outer contour of the reinforcement and/or lining element and the distal broadening is adapted to the cross section of the initial opening, and the blades may protrude radially into the material to be reinforced and/or lined.

Figure 5C:
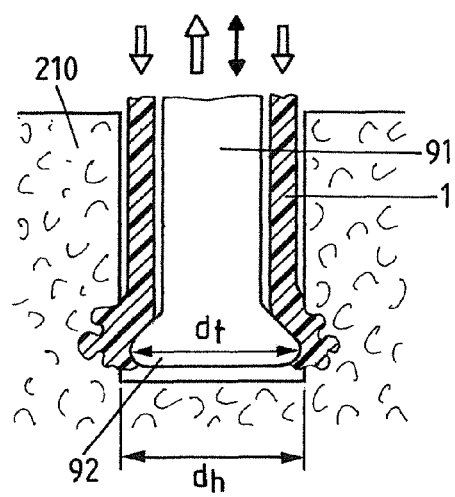

FIG. 5*c* yet shows a variant of the "rearward" configuration of FIGS. 5*a* and 5*b* in which the tool (sonotrode) does not include any blades. In the depicted embodiment, the proximally facing shoulder of the distal broadening 92 of the tool is slanted so that upon a relative movement of the sonotrode with respect to the reinforcement and/or lining element—while mechanical energy is coupled into the sonotrode—causes material liquefied at the interface between the sonotrode's distal broadening 92 and the distal end of the reinforcement and/or lining element 1 to be displaced into the surrounding porous material 210 more easily. In FIG. 5*c*, also the outer diameter of the tool $d_t$ and the diameter $d_h$ of the initial opening are illustrated. Clearly, the tool diameter $d_t$ is only slightly smaller than the hole diameter (and thus is approximately equal) so that a substantial portion of the material liquefied at the interface to is displaced into the surrounding material.

This illustrates the concept that the relative dimensions of the tool's distal broadening 92 and the reinforcement and/or lining element 1 are chosen so that the full cross section of the reinforcement and/or lining element 1 is liquefied and displaced by the tool. After the process, either all of the reinforcement and/or lining material has penetrated the object, or a coating-like layer remains on the wall of the initial opening and clads it thereby.

Figure 6:
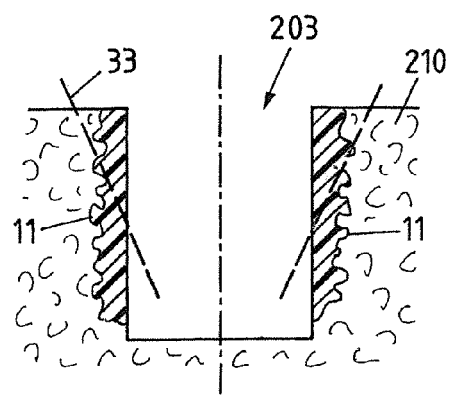

FIG. 6 shows, in cross section along the proximodistal axis, a configuration where an initial opening 203 of for example cylindrical shape has been reinforced so that reinforcement and/or lining material portions 11 strengthen the porous material. This reinforcement and/or lining may be a segmented reinforcement and/or lining where the segmentation material is confined to certain angles around the circumference—for example as taught referring to previous figures—or may be a non-segmented reinforcement and/or lining where the reinforcement and/or lining material is distributed around the periphery. Subsequently, porous material and material may be removed along the dashed line 33 so that the reinforced porous material surface becomes restricted to the deeper regions of the opening.

Circumferential segmentation and depth dependence of the reinforcement and/or lining may be combined. An example is illustrated in FIGS. 7*a*-7*c*. The initial opening is stepped and has a large diameter proximal portion and a smaller diameter distal portion so that a shoulder 111 is formed. The guiding shaft 5 in cross section has a shape as illustrated in FIG. 7*c*. FIGS. 7*a* and 7*b* correspond to cross sections along planes that in the section only through the guiding shaft (FIG. 7*c*) correspond to the lines A-A and B-B, respectively. The reinforcement and/or lining element has first reinforcement and/or lining element portions 1.1, 1.2 that are positioned around at the periphery and that during the method step of liquefying are pressed against the shoulder. Second reinforcement and/or lining element portions 1.3, 1.4 are located distally in the channels 5.1 of the guiding shaft. During liquefaction, they are pressed against the bottom of the initial opening. The shape of the sonotrode 3 is accordingly adapted. As an alternative to the depicted configuration, the auxiliary element may include abutment protrusions that axially extend from the guiding shaft proximally of the shoulder 111 and/or a distal broadening of the kind illustrated in FIG. 2*b* so that the counterforce to the pressing force is not exerted by the porous material but by the auxiliary element.

Provided with according structures, the element 2 may alternatively serve as a sonotrode in a "rearward" configuration, in which then the liquefaction interface is the interface between such structure and the reinforcement and/or lining element.

FIG. 8 shows yet another example of segmented reinforcement and/or lining, again in cross section parallel to the proximodistal axis. The embodiment of FIG. 8 may combine axial segmentation (i.e. reinforcement and/or lining at different depths) with circumferential segmentation. In the embodiment of FIG. 8, the initial opening is tapered, it is for example conical. The auxiliary element 2 has an accordingly tapered shape. For the reinforcement and/or lining process, it is to be placed in the initial opening, with a circumferential wall and possibly a distal end in contact with porous material as shown in FIG. 8. The auxiliary element is a body with openings accessible from the proximal side. Between the openings and the circumferential wall, there are holes. For example, a larger, central opening 41 includes a plurality of holes 43 distributed regularly or irregularly around the periphery. Smaller, peripheral openings, for example, each include a lateral hole 43 The peripheral openings 42 may be distributed regularly or irregularly along the periphery. It would also be possible for the auxiliary element to include a single peripheral opening only. The reinforcement and/or lining elements 1 may, for example, be pin-shaped, with an outer diameter adapted to the dimension of the opening they are provided for. During the reinforcement and/or lining process, reinforcement and/or lining elements 1 are inserted in the openings and pressed towards the distal direction while mechanical energy impinges on the respective reinforcement and/or lining element. Thereby, the reinforcement and/or lining material at the distal end of the reinforcement and/or lining elements is liquefied and pressed out of the holes into the surrounding porous material. The auxiliary element may be removed after liquefaction of the reinforcement and/or lining material; for example, removal may be made immediately after the offset of the mechanical energy input (for example, the vibrations) so that the reinforcement and/or lining material is still soft in vicinity to the auxiliary element. As an alternative, a cutting element may be used for removing the auxiliary element; such cutting element may, for example, be a feature (proximally facing cutting edge or similar) adjacent to the holes 43 that cuts through the reinforcement and/or lining material portions that are at the interface between the auxiliary element 2 and the porous material.

In addition or as an alternative to the openings 41, 42, the auxiliary element—that may be viewed as guiding tool for individual reinforcement and/or lining elements 1 may have indentations (openings) along the circumferential surface. After a reinforcement and/or lining process using such an auxiliary element, thermoplastic reinforcement and/or lining material portions may protrude into the conical opening and thus need not be restricted to the porous material. Such embodiments are especially advantageous in situations where the subsequent anchoring of the joining element involves welding thermoplastic material of the joining element to the reinforcement and/or lining material or involves a joining element with a surface structure into which, when the reinforcement and/or lining material during anchoring is again liquefied, again thermoplastic material may penetrate to generate a positive-fit connection.

The possible principle of a subsequent anchoring of a joining element to the reinforcement and/or lining material or of causing the reinforcement and/or lining material to be again liquefied during anchoring and to penetrate structures of the joining element to generate a positive-fit connection may apply also to other embodiments of the present invention than the one illustrated in FIG. 8. More in particular, it is an option for all embodiments. The embodiments that provide segmented reinforcement and/or lining then feature the additional potential advantage that the operator can choose where the weld connection or positive-fit connection of the joining element is to be—by appropriately choosing the lined and/or reinforced locations on the surface of the initial opening.

Next, embodiments of the aspect of impact/energy minimization are described. In these described embodiments, the energy coupled into the set-up during the process is mechanical vibration energy and the tool is a sonotrode. However, the concept can readily be expanded to other energy forms, including other mechanical energy (for example rotation), heat, electromagnetic radiation.

Figure 9A:
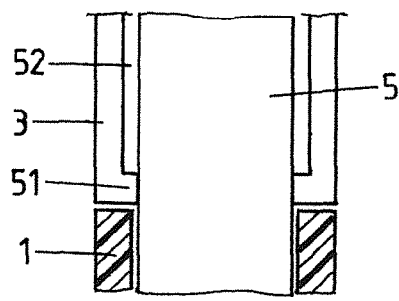
FIGS. 9a-20 concepts of reinforcement and/or lining with impact/energy minimization.
Figure 9B:
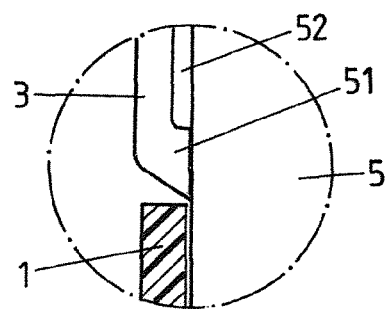

FIGS. 9a and 9b, in cross sections parallel to the proximodistal axis, show a first approach. It has been found that substantial noise and also possibly energy losses are caused by the contact between the sonotrode 3 and the guiding shaft 5 of the auxiliary element in configurations where the sonotrode and possibly also the reinforcement and/or lining element is/are guided by the guiding shaft. The region where the tool (sonotrode) and the auxiliary element slidingly overlap is also denoted "telescoping region" in the present text.

In FIGS. 9a and 9b, the inner diameter of the sonotrode is larger than the outer diameter of the guiding shaft so that a buffer volume 52 is formed around the guiding shaft. The sonotrode includes an inward projection 51 at the distal end thereof. The inward projection is, for example, an inwardly projecting ridge forming a contact surface in direct contact with the guiding shaft. The contact surface fully encompasses the shaft forming a sealing for liquefied material preventing the latter from penetrating into the buffer volume.

In the embodiment of FIG. 9a, the distal end face of the sonotrode that forms the contact with the reinforcement and/or lining element 1 is essentially flat and radial with respect to the axis, whereas the embodiment of FIG. 9b has a tapered sonotrode surface that helps to push the liquefied reinforcement and/or lining material outward into the surrounding porous material. In all embodiments, the contact face between the sonotrode and the reinforcement and/or lining element may generally have any shape, including flat, curved, tapered etc.

In the shown embodiment, the inward projection 51 is one-piece with the rest of the sonotrode. In alternative embodiments, a separate part—that can be viewed as a bushing—may be used. The use of such separate part may be advantageous, especially since a suitable material may be used. Such suitable material may be chosen so that it minimizes the sonotrode impact/the application of energy while it is not necessarily a good conductor for ultrasonic vibrations. An example of a suitable material for a bushing is PEEK; alternatively other polymer materials that have a comparably small friction coefficient to steel, such as PTFE, PA, etc. or other plastic or non-plastic materials may be used.

As a further option, the inward projection, especially if formed by a separate part (bushing), could include a small circumferential scraping lip in contact with the guiding shaft. As an alternative to such a scraping lip, also a corresponding fit allowing for a relative movement, such as a transition fit etc. may be used, especially for a hard-soft material combination between guiding shaft and projection/bushing 51.

In addition or as an alternative to the above-discussed variants, the buffer volume 52 may be partially or entirely filled by a material with reduced friction/noise development between the shaft and the vibrating parts. Such material then may serve as a kind of inner liner; the material may, for example, be a polymer such as PEEK, PTFE, PA, etc.

Figure 10:
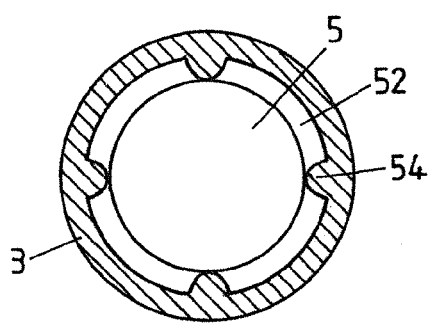
Figure 11:
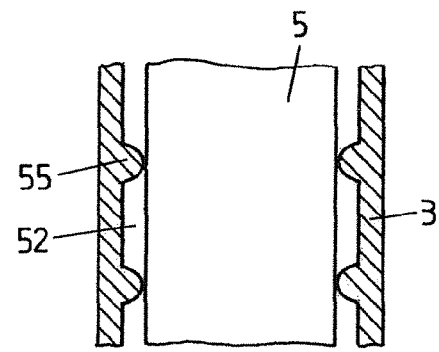

FIG. 10 depicts, in cross section perpendicular to the proximodistal axis, an embodiment where the sonotrode includes inwardly projecting axial ribs 54 so that again the contact surface between the sonotrode and the guiding shaft is diminished. This may optionally be combined with a distal inwardly projecting ridge as shown in FIGS. 9a, 9b. FIG. 11 (in cross section parallel to the proximodistal axis) similarly shows a configuration with inwardly projecting circumferential ribs 55. Again, a combination with the distal ridge is possible. Alternatively, instead of ribs or in addition thereto the sonotrode may include other inward projections such as humps, etc.

FIGS. 9a-11, as well as FIGS. 17 and 18 described hereinafter, show examples of configurations where the area of the surface between the sonotrode and the auxiliary element is considerably reduced compared to configurations where the sonotrode is a cylindrical sleeve surrounding a cylindrical shaft. More in particular, in the telescoping region the contact surface is substantially (for example by at least a factor 2) smaller than the outer surface area of the auxiliary element in that telescoping region.

An other group of approaches for impact/energy minimization, which may be combined with the approach of diminishing the direct contact between sonotrode and guiding shaft, is shown in FIGS. 12-15. The embodiments of these figures all include the concept that the reinforcement and/or lining element is shaped in a manner that causes the reinforcement and/or lining element, or at least portions thereof, to be liquefied with less energy impact, i.e. onset as a function of the energy that impinges on the reinforcement and/or lining element is earlier. This allows to reduce the power of the energy source, for example the power by which the sonotrode is operated.

Figure 12:
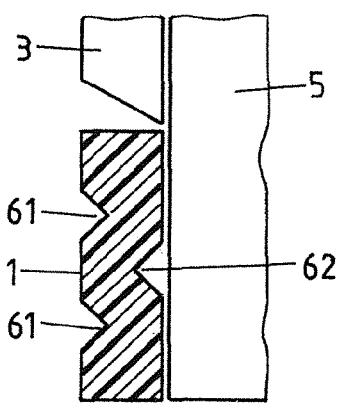
Figure 13:
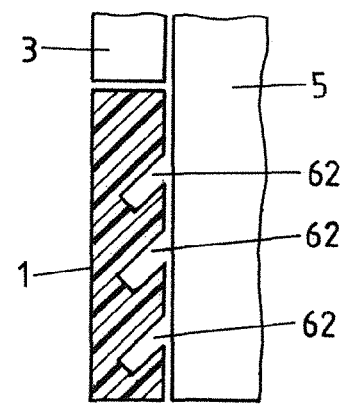

The cross sections of FIGS. 12 and 13 show a section of a generally rotationally symmetrical arrangement, with the symmetry axis (not shown) through the guiding shaft 5. The reinforcement and/or lining element 1 of FIG. 12 includes outer and inner grooves 61, 62, respectively, whereas the reinforcement and/or lining element of FIG. 13 has inner grooves 62. The grooves systematically weaken the reinforcement and/or lining element and, by causing necks, provide spots where the liquefaction upon absorption of the mechanical energy sets in first. Further, the inner grooves 62 of the embodiment of FIG. 13 are slanted towards the outside so that after onset of liquefaction at the necks the more proximal portions slide on the more distal portions and are forced outwardly, so that additional friction of not yet liquefied reinforcement and/or lining material with the lateral walls of the initial opening and/or an additional pressure onto the liquefied material is caused, both effects potentially assisting the reinforcement and/or lining process. A similar effect could be achieved by outer grooves that run along same conical surfaces as the illustrated embodiments, i.e. the grooves are such that after a liquefaction at the weak spots (necks) the more proximal parts of the reinforcement and/or lining element are subject to a shear movement that forces them outwardly when they are subject to pressure from the sonotrode 3. In both variants (and in combinations), an additional axial division (not shown in FIG. 13) or a circumferential segmentation as illustrated in previous embodiments may ensure sufficient flexibility for such an outward movement.

The grooves 61, 62 of the embodiments of FIGS. 12 and 13 or similar weakenings of the reinforcement and/or lining element 1 may also be chosen for not rotationally symmetrical arrangements, such as arrangements that include segmentation in accordance with any one of the embodiments described hereinbefore.

Figure 14:
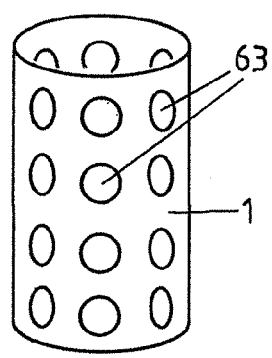
Figure 15:
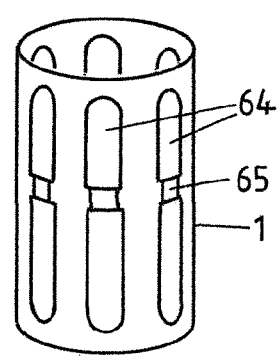

The embodiments of FIGS. 14 and 15 show views of other variants of systematically weakened reinforcement and/or lining elements. The embodiment of FIG. 14 includes a reinforcement and/or lining element 1 having generally a shape of a rotational cylinder with a plurality of through holes 63. In the depicted embodiment, the through holes are arranged in axial rows. Generally, the position and distribution of holes or other weakenings of the reinforcement and/or lining element may be chosen according to the needs.

In the embodiment of FIG. 15, the reinforcement and/or lining element 1 having generally a shape of a rotational cylinder includes elongate axial holes 64. The axial extension of such holes may correspond to a substantial portion (for example at least ½ or even at least ⅔) of the axial length of the reinforcement and/or lining element 1. The axial holes, in addition to reducing the power requirements of the mechanical energy impact, may have the effect of causing a weak circumferential segmentation. The extension (along the circumferential direction) and the distribution of the axial elongate holes 64 may be chosen accordingly. In the depicted configuration, the reinforcement and/or lining element further includes bridge portions 65 that form bridges over the elongate holes, for example approximately in their middle, to enhance the mechanical stability of the reinforcement and/or lining element. Especially if a circumferential segmentation effect of the reinforcement and/or lining material is desired, the bridge portions 65 may have a minimal material strength only; for example, they may be thinner than the body of the reinforcement and/or lining element.

Figure 16:
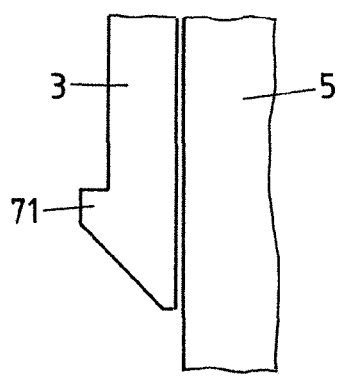

The embodiment of FIG. 16 (shown in section) includes a sonotrode 3 with an outwardly protruding (salient) distal feature 71, such as a circumferential ridge. Due to this shape, the sonotrode has a reduced thickness at more proximal positions so that it does not get into direct contact with the porous material proximally of the distal feature 71. This significantly reduces the impact, especially frictional heating of the adjacent porous material.

An outwardly protruding distal feature of the kind illustrated in FIG. 16 may be realized in embodiments with a tapering contact face of the sonotrode to the reinforcement and/or lining element (as shown in FIG. 16), in embodiments with a flat contact face, or in combination with any other contact face shape. Combinations with the approaches of any one of the previous figures, including minimization of the contact surface between sonotrode and guiding shaft as illustrated in FIGS. 9-11 are possible.

Figure 17:
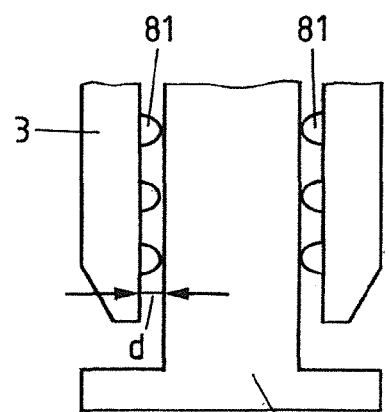

Another possibility of minimizing the sonotrode impact, especially the noise created by friction between sonotrode and guiding shaft, is shown in section in FIG. 17. The sonotrode in this embodiment includes a plurality of inwardly facing micro-protrusions 81. The micro-protrusions, which may be conical or calotte shaped or have other shapes, abut against the auxiliary element 2 guiding shaft and thereby cause the contact surface between the sonotrode 3 and the guiding shaft to be minimal. The micro-protrusions 81 have a height that is comparably small so that the resulting gap between the shaft and the sonotrode has a thickness d that is so small that due to surface tension substantially no liquefied thermoplastic material will penetrate into the gap. In particular, the gap thickness d (approximately corresponding to the height of the protrusions) may be between 0.02 mm and 0.2 mm. In a gap having a thickness of this order of magnitude, no thermoplastic material will penetrate.

Whereas FIG. 17 shows the micro-protrusions being inwardly protruding features of the sonotrode, it would also be possible to provide according outwardly facing protrusions of the guiding shaft.

Figure 18:
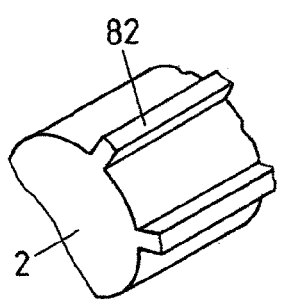

As an alternative to micro-protrusions that define punctiform contact surface portions, it would also be possible to have ridge-shaped micro-protrusions 82 as illustrated in FIG. 18. The embodiment of FIG. 18 includes the micro-protrusions 82 at the guiding shaft; of course, according (inwardly facing) ridge-shaped micro-protrusions may also be present at the sonotrode. The radial dimension of the protrusions of FIG. 18 may again be in the range between 0.02 mm and 0.2 mm.

Also for the embodiments of FIGS. 9-15 and of FIGS. 17, 18, there exist "rearward" configuration variants if the element with the shaft 5 (that is provided with a distal broadening) is used as a sonotrode coupled to a vibration source and the bushing-like element 3 is used as a counter element; the liquefaction interface then being the interface between the distal broadening and the reinforcement and/or lining element.

Next, referring to all embodiments of the various aspects of the invention, some considerations on reinforcement and/or lining element dimensions, especially wall thickness are made. These considerations are based on the assumption that the porous material in the infiltration process is not pushed aside but solely infiltrated by the reinforcement and/or lining material. However, an effect of pushing aside portions of the infiltrated material is taken into account indirectly, too, namely by the determination of the apparent porosity as explained hereinafter. The thickness primarily depends on the desired infiltration depth (penetration depth), and on the porosity of the porous material. First assuming that the reinforcement and/or lining element is tube-shaped and the radius of the reinforcement and/or lining element is much larger than the wall thickness—so that a plane configuration can be assumed in approximation, for an infiltration depth of 1 mm and a porosity of 40% (for example a light composite material), the wall thickness is 0.4 mm. For a porosity of 80% (for example a metallic foam), one gets a wall thickness of 0.8 mm for a penetration depth of 1 mm, and for a porosity of 60% one obtains 0.6 mm wall thickness. In the present approximation, the wall thickness is a linear function of the penetration depth, so that for example for a penetration depth of 2 mm and a porosity of 80%, the wall thickness has to be 1.6 mm. In these considerations, it is assumed that the material flow is ideal and that all reinforcement and/or lining element material is displaced into the porous material. In reality, this is not the case. Rather, the porous material promotes a freezing behavior of penetrating thermoplastic material, which freezing behavior is the more pronounced the denser the porous material, the higher its heat capacity and the higher its thermal conductivity. This effect can be taken into account by replacing the real, measured porosity by a reduced apparent porosity. The apparent porosity can be measured by the following process:

- Reinforcement and/or lining using a simple reinforcement and/or lining cylinder of given wall thickness $d_w$ (for example 0.5 mm) in porous material, for example, a wood composite material or a foam porous material, complete displacing in penetration
- Measuring of an average penetration depth $d_m$ and a penetration height $h_m$ (corresponding to the axial extension of the reinforced porous material portion)
- Calculating a correction factor $F=d_m/d_t * h_s/h_m$ where $d_t$ denotes the theoretical penetration depth in accordance with the above considerations for ideal material flow and $h_s$ is the original height of the reinforcement and/or lining element, and
- Calculating an apparent porosity $P_A$ to be $P*F$.

In an example measurement with $P=35\%$, the values of $d_m/d_t=0.6$ and $h_m/h_s=0.9$ have been obtained, so that $F=0.667$. For a porosity of 40% and a penetration depth of 1 mm one then obtains a wall thickness of 0.267 mm. The wall thickness is again proportional to both, the penetration depth and the porosity, so that starting from this value other wall thicknesses can be calculated.

If not all reinforcement and/or lining material is displaced into the porous material, residual wall thicknesses of material remaining within the lined opening are to be added to the wall thickness.

In cases of segmented reinforcement and/or lining and/or reinforcement and/or lining elements with openings, along the axially running edges there will be additional material flow in circumferential directions to some extent. As a rule, polymer flow will broaden the reinforced region (in circumferential direction) by about 0.5-1 mm. Thus, at these regions there will be an accordingly reduced infiltration depth. This is usually not critical and/or can be taken into account by using according corrections.

Figure 19:
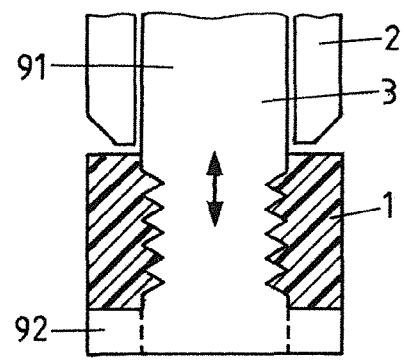

FIG. 19 shows, again in section, yet another approach of sonotrode impact minimization. In the embodiment of FIG. 19, the sonotrode 3 includes a sonotrode shaft 91 that is, at more proximal axial positions, encompassed by the auxiliary element 2 having the shape a sleeve. The reinforcement and/or lining element 1 is held by the sonotrode, for example in an interlocking connection. For example, the sonotrode 3 may have an outer thread, and the auxiliary element may be screwed onto the sonotrode. In the depicted configuration, the sonotrode has an—optional—distal broadening 92 (foot) that is an additional support securing the reinforcement and/or lining element against escaping in a distal direction.

During the reinforcement and/or lining process, the sonotrode with the reinforcement and/or lining element affixed to it vibrates while the sleeve-like auxiliary element is pressed against the proximal surface of the reinforcement and/or lining element. At the interface between the sonotrode and the sleeve-like auxiliary element, mechanical energy is absorbed causing the reinforcement and/or lining element material to partially liquefy. During the process, for example, the sonotrode's axial position may be held still while the auxiliary element 2 is pressed forward.

The embodiment of FIG. 19, like other embodiments of "rearward" configurations described in the present document, features the advantage that due to the configuration with the central sonotrode and the peripheral auxiliary element, there is only minimal contact between the sonotrode and the porous material surrounding the initial opening.

An assembly corresponding to the one of FIG. 19 would also be possible in a 'forward' arrangement where the contact face between the reinforcement and/or lining element and the auxiliary element is at the distal end of the reinforcement and/or lining element. In such an assembly, the auxiliary element may, for example, have a thin shaft carrying a distal foot (that includes the contact face), the shaft reaching through the sonotrode. While such a configuration is a possibility, the configuration of FIG. 19 has the additional advantage of being more straightforward to implement.

Further, optionally, the distal end of the sonotrode could be provided with a cutting or piercing functionality, for example according to the sixth aspect of the invention. Such a piercing or cutting feature could for example work as a optionally vibration assisted awl when introducing the assembly in the porous material—the initial opening does then not need to be pre-made in a separate step but can be made by introducing the assembly.

Figure 20:
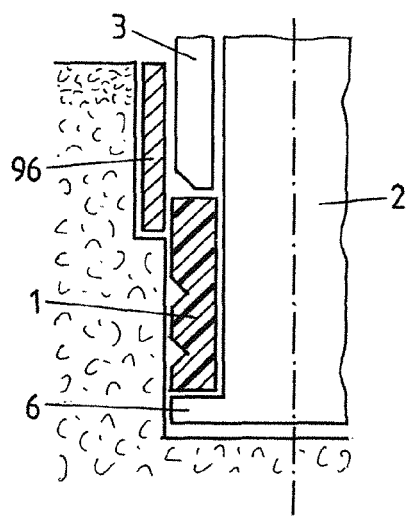

FIG. 20 shows in section an embodiment comprising a protecting element 96. The protection element at least partially encompasses the sonotrode 3 and thereby protects the porous material. The protection element 96 may include a distal cutting/reaming structure and/or a tapping structure to provide the reinforced or not reinforced porous material with a thread.

In the depicted configuration, the protecting element 96 is shown in combination with a stepped opening. This is not a requirement; sufficiently thin (<0.1 mm or 0.05 mm) protecting elements of sufficiently stiff material (for example, steel) may also be used together with not stepped openings. A stepped opening may be provided in that the initial opening is made in a stepped fashion (for example using two drills of different diameters), or by a self-cutting structure of the protecting element itself, that then may, for example, also advance during the reinforcement and/or lining process to prevent all of the sonotrode with the possible exception of the most distal portion from getting into contact with the porous material.

A protecting element 96 could optionally be segmented in a circumferential direction and then optionally project further to the distal side, for example down to the bottom of the opening. Thereby, it locally masks the porous material and causes segmented reinforcement and/or lining. In this variant, the set-up of FIG. 20 is a further embodiment of the method according to its first aspect.

In an even further embodiment, a protecting element 96 serving as a mask could have a geometry of the kind illustrated for the reinforcement and/or lining element in FIGS. 14 and 15, i.e. include a body with a plurality of openings, especially in a segmented manner, i.e. including, as a function of the azimuthal angle, sections with openings and sections without openings. The openings in this even further embodiment may constitute a substantial portion of the surface of the element's convex hull, i.e. the empty spaces may constitute a substantial portion of for example at least 50%, at least 60% or at least ⅔ of the surface of an imaginary cylinder of which the protecting element 96 forms the non-empty portions.

In yet another embodiment, the protecting element may be configured to be porous, infiltrated (during the process) by the thermoplastic material, and to remain in place and thereafter serve as contact element, for example for conducting heat and/or electricity or as mounting element.

In all embodiments with a protecting element, (that may in some embodiments, as mentioned, serve as mask) the material of the protecting element may be a metal or a ceramic material. Because the surface of such material is repellant for liquefied thermoplastic material, the polymer will only weakly adhere to the protecting element so that the latter may be relatively easily be removed. This is even the case in configurations of the above-mentioned kind with openings through which the polymer material gets to the porous material—if the thickness of the protecting element is sufficiently thin, for example having a thickness of 0.1 mm or less.

In all embodiments with a protecting element, the protecting element may optionally be provided with an axial slit so that after removal of the shaft it may be radially collapsed and/or peeled off for removal.

The embodiments of FIG. 20 in addition may have the following optional features:

the distal foot 6 that for example is used if the initial opening is a through hole or if the material at the base of the initial opening is too weak to withstand the pressure on the reinforcement and/or lining element;

weakening grooves at the outside of the reinforcement and/or lining element 1.

Figure 21:
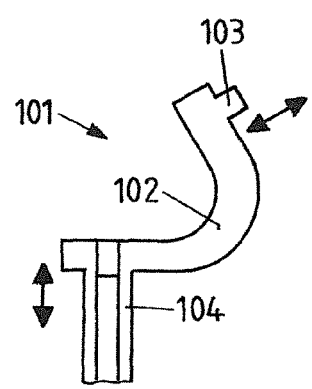
FIGS. 21-23 concepts of deflecting mechanical vibrations for a reinforcement and/or lining process.

According to yet another approach, the reinforcement and/or lining process may be combined with measures to deflect mechanical oscillations. A first approach is schematically illustrated in FIG. 21. FIG. 21 depicts a device 101 for deflecting mechanical oscillations comprising an elongate and bent oscillation element 102, so that the oscillation element 101 when excited to oscillate transversally at a coupling-in point oscillates transversally at a coupling-out point. The coupling-in point includes an input terminal 103 (that may be coupled to an oscillation source), and at the coupling-out point an output terminal 104 is formed, wherein a is provided with a sleeve-like terminal 104 that may either serve as the sonotrode (or a part thereof) or that may define an interface to the sonotrode. An auxiliary element that guides the reinforcement and/or lining element during the process may be guided in the center of the sleeve-like terminal 104. The device 101 at the region of the output terminal 104 may also include a through opening (cannulation) through which the auxiliary element may project and be held from its proximal side. While the embodiment of FIG. 20 does not readily allow for active application of a counter-force to the applied force by which the sonotrode is pressed against the distal direction, such active counter-force may not be necessary in cases where the porous material has enough strength to provide sufficient resistance.

Figure 22:
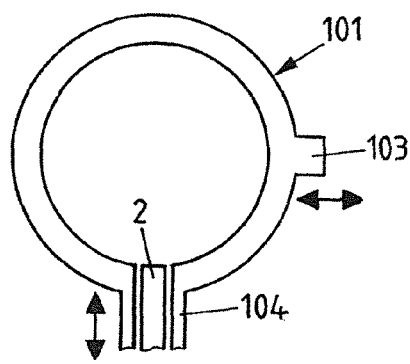

Yet another approach is depicted in FIG. 22. FIG. 22 illustrates a deflection device 101 that has a ring-shaped resonating body. The angle between the coupling-in port ant the coupling-out point is an integer fraction of 360°. The coupling-out terminal 104 may again be sleeve-like. The auxiliary element 2 may be passively guided in an interior of the sleeve-like terminal 104. It may also be held by (not shown) elements that grip the auxiliary from outside of the plane defined by the ring-shaped resonating body.

Figure 23:
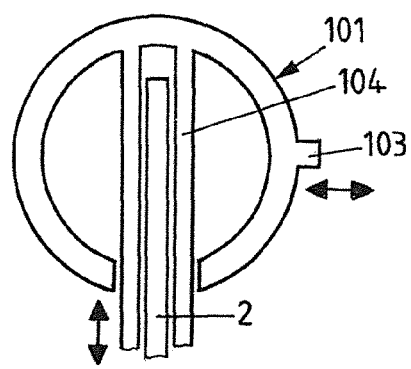

A variant of the embodiment of FIG. 22 is shown in FIG. 23. In contrast to the embodiment of FIG. 22, the coupling-out terminal 104 is attached to the inside of the ring and to its proximal (upper) portion.

In a variant of the embodiment of FIG. 23, the ring-shaped resonating body may be closed. The coupling-out terminal 104 may then project through a bore in the ring.

Next, referring to the following Figures, further embodiments and applications of processes according to aspect and embodiments of the invention are described. For these embodiments and applications, embodiments of segmented reinforcement and/or lining and/or of sonotrode impact minimization may be used. Alternatively, these embodiments/applications may be used in an other process comprising the steps of:

providing an initial opening in the porous material;
providing a thermoplastic reinforcement and/or lining element and a tool;
placing the reinforcement and/or lining element in the initial opening, placing the tool in contact with a face of the reinforcement and/or lining element and pressing the tool towards a distal direction against the face while energy is coupled into the tool and while a periphery of a liquefaction interface of the tool and the reinforcement and/or lining element is within the opening;
thereby liquefying material of the reinforcement and/or lining element at the liquefaction interface(s) to yield liquefied material;
causing portions of the liquefied material to penetrate into structures of the porous material;
allowing the liquefied material to harden and to thereby become reinforcement and/or lining material; and
removing the tool.

This is especially the case in embodiments in which an outer diameter of the tool (at least in the region of the liquefaction interface, thus in rearward configurations the distal broadening) approximately corresponds to the inner diameter of the initial opening (for example is equal or smaller by at most 10% or at most 5% or at most 3%) and/or approximately corresponds to the outer diameter of the reinforcement and/or lining element (for example, corresponds to the outer diameter or is larger or smaller by at most 7%, at most 4% or at most 2%).

Figure 24A:
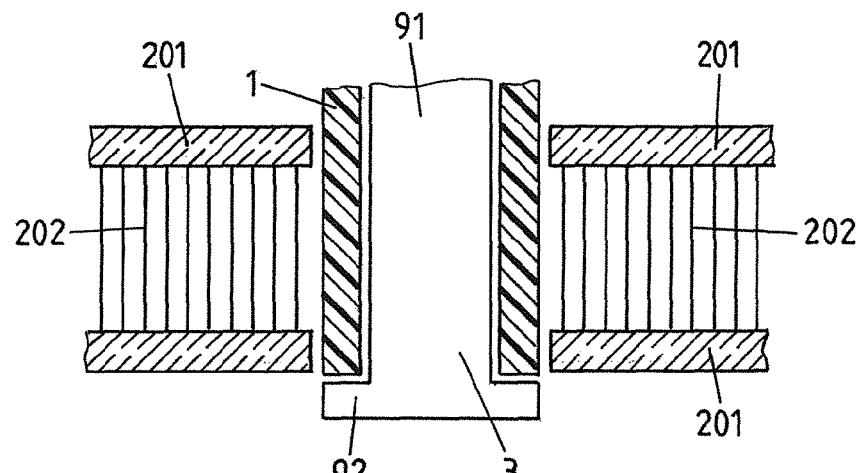
FIGS. 24 and 25 applications of reinforcement and/or lining process in construction elements.

FIG. 24a shows an object with an initial opening to be lined, namely a lightweight board that has two hard cover layers 201, and a soft, porous, and light filling layer 202 between the cover layers. The tool 3 (sonotrode) and the reinforcement and/or lining element 1 are shown in a rearward configuration. The counter element is not shown in the figure. In the depicted configuration, the distal broadening 92 of the tool 3 and the outer diameter of the reinforcement and/or lining element 1 are chosen to be smaller than the inner diameter of the initial opening in the lightweight board.

Figure 24B:
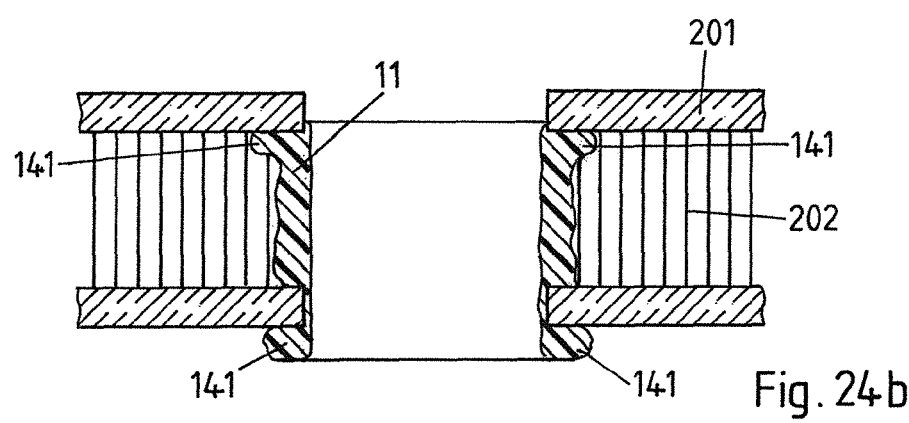

FIG. 24b depicts the lightweight board after the reinforcement and/or lining process. Because the cover layers 201 are hard and not porous, the reinforcement and/or lining material 11 is kept back by them, and this results in a radial bulge 141 underneath them. This radial bulge stabilizes the reinforcement and/or lining material 11 further against axial forces in directions that correspond to the proximal direction during the reinforcement and/or lining process. If a building element, such as a joining element or a fitting is then inserted in the reinforced/lined opening, this effect provides additional anchoring stability.

Figure 25:
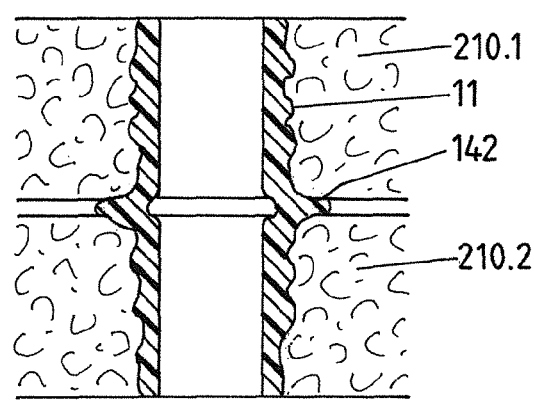

The object with the initial opening illustrated in FIG. 25 includes two elements 210.1, 210.2 of the porous material (for example wood composite or ceramic foam) stapled on top of each other and having a common lined/reinforced opening. As illustrated in the figure, the reinforcement and/or lining material 11 may encounter less resistance at the transition between the elements 210.1, 210.2, and this may result in a bulge 142 in the transition region. Such a bulge may stabilize the ensemble of the two elements and at least to some extent fasten them to each other.

Figure 26:
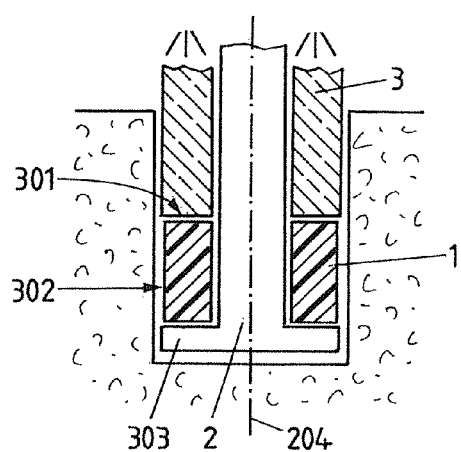
FIG. 26 the concept of using radiation for coupling energy into the reinforcement and/or lining element.

FIG. 26 schematically illustrates using a radiation source for coupling energy into the reinforcement and/or lining element 1 for the step of impinging the reinforcement and/or lining element with energy while the same is subject to a pressing force. To this end, the tool 3 is chosen to be a glass cylinder into which radiation is coupled from the proximal side. The auxiliary element 2 includes a foot interfacing with the distal end face of the reinforcement and/or lining element. The light coming in through the tool 3 may be absorbed at the distal end 301 of the tool 3, by the reinforcement and/or lining element (reference number 302), or at the surface 303 of the foot at the interface to the reinforcement and/or lining element.

Figure 27:
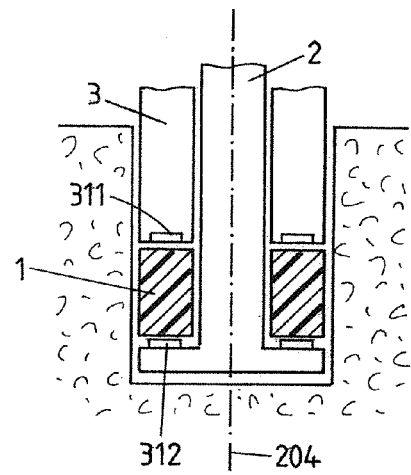
FIG. 27 the concept of using electricity for coupling energy into the reinforcement and/or lining element.

FIG. 27 shows an example of electricity conducted through the reinforcement and/or lining element 1 (which then includes an electrically conducting material with a relatively low conductivity). To this end, the tool 3 includes a first electrode 311 at the interface to the reinforcement and/or lining element 1 and the auxiliary element 2 includes a second electrode 312 at the interface to the reinforcement and/or lining element.

As an alternative, the tool 3 could be provided with a resistance heater capable of heating the interface to the reinforcement and/or lining element. Note that this is possible both, in a forward configuration with a tool 3 as shown in FIG. 27 as well as in rearward configurations with a tool having the shape of the auxiliary element 2 of FIG. 27 and with a counter element for exerting a counter force, the counter element example having the shape of the tool of FIG. 3.

The configurations in FIGS. 26 and 27 may be symmetric about the axis 204 or may be formed as in examples of the hereinbefore described kind, especially in examples of segmented reinforcement and/or lining.

Figure 28:
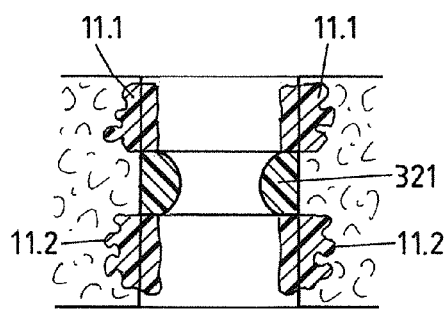
FIG. 28 an application of segmented reinforcement and/or lining.
Figure 29A:
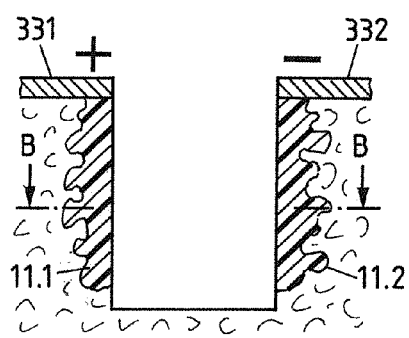
FIGS. 29a-29c and 30 another application of segmented reinforcement and/or lining.
Figure 29C:
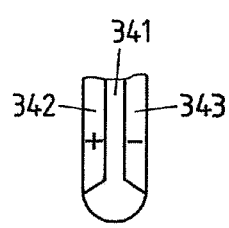
Figure 30:
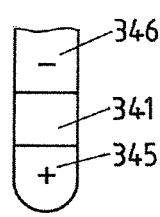

FIGS. 28-30 yet illustrate examples of applications of segmented reinforcement and/or lining.

In the example of FIG. 28, the reinforcement and/or lining material 11.1, 11.2 is axially segmented. The reinforcement and/or lining material 11.1, 11.2 lines the inner surface of a through opening and in the depicted configuration is allowed to slightly protrude beyond the initial surface of the opening, so that a circumferential groove remains between the segments. In this groove, a sealing ring 321 is arranged.

Together with an axle (not shown) on which the sealing ring sits, this configuration may be used to assist sealing of two axially spaced segments of an axle mounted in the object against each other.

Figure 29B:
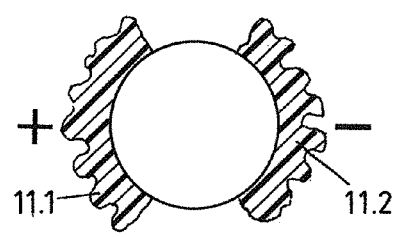

FIGS. 29a and 29b (FIG. 29b shows a section through plane B-B in FIG. 29a) illustrate an example where the segments 11.1, 11.2 of the reinforcement and/or lining material are used as different electrical contacts for a plug 341 with two electrodes 342, 343 electrically isolated from each other. According electrodes 331, 332 are schematically depicted in FIG. 29a.

The same principle is also applicable for an opening with axially spaced augmented segments (similar to FIG. 28, but possibly without the sealing ring). An according plug 341 with electrodes 345, 346 is shown in FIG. 30.

What is claimed is:

1. A method of reinforcing porous material or lining porous material or reinforcing and lining porous material, comprising the steps of:
   providing an initial opening in the porous material;
   providing a thermoplastic element, and further providing a tool and an auxiliary element;
   placing the thermoplastic element in the initial opening, the thermoplastic element at least partially encompassing a guiding portion of the tool or of the auxiliary element,
   coupling a pressing force and energy into the tool and from the tool directly into the thermoplastic element while a portion of the thermoplastic element is within the opening and in contact with the porous material;
   thereby liquefying material of the thermoplastic element to yield liquefied material;
   causing portions of the liquefied material to penetrate into structures of the porous material and/or into structures of an element connected to the porous material;
   allowing the liquefied material to harden; and
   removing the tool;
   wherein at least one of the following conditions is fulfilled:
   A. during the step of coupling a pressing force and energy into the tool, an outer protection element at least partially encompasses the tool and locally prevents the tool from being in contact with the porous material;
   B. the thermoplastic element is generally sleeve-shaped and comprises at least one indentation or hole in a sleeve wall;
   C. during the step of coupling a pressing force and energy into the tool, in a telescoping region a portion of the tool encompasses a portion of the auxiliary element or a portion of the auxiliary element encompasses the tool, wherein at least one of the tool and of the auxiliary element comprises at least one protrusion facing to the other one of the tool and the auxiliary element, whereby in the telescoping region a contact between the tool and the auxiliary element at locations different from the at least one protrusion is prevented;
   D. during the step of coupling a pressing force and energy into the tool, the tool is pressed towards the distal direction, and wherein the tool comprises a distal broadening forming a salient feature that prevents a contact between the tool and the porous material at locations proximally of the salient feature;
   E. prior to the step coupling a pressing force energy into the tool, the thermoplastic element is connected to the tool by an axial positive-fit connection, and during the step of coupling a pressing force and energy into the tool, the auxiliary element is pressed against a distal direction to activate the step of liquefying material of the thermoplastic element and to push portions of the liquefied material aside and into the structures of the porous material.

2. The method according to claim 1, wherein at least condition A. is fulfilled, wherein the protection element comprises a tap for cutting a thread.

3. The method according to claim 1, wherein at least condition B. is fulfilled, wherein the thermoplastic element is generally sleeve-shaped.

4. The method according to claim 1, wherein at least condition C. is fulfilled, wherein at a distal end of the tool any remaining gap between the tool and the auxiliary element has a width of 0.2 mm or less.

5. The method according to claim 1, wherein at least condition E. is fulfilled, wherein the sonotrode has a threaded outer surface portion, and wherein the threaded outer surface portion is encompassed by the thermoplastic element.

6. The method according to claim 1, wherein the energy is coupled into the tool in the form of mechanical vibrations.

7. A method of reinforcing an object or lining an object or reinforcing and lining an object, the method comprising the steps of:
providing an initial opening in the object;
providing a thermoplastic element and a tool;
placing the thermoplastic element in the initial opening, placing the tool in direct contact with a face of the thermoplastic element and pressing the tool against the face while energy is coupled into the tool and while a periphery of a liquefaction interface of the tool and the thermoplastic element is within the opening;
thereby liquefying material of the thermoplastic element at the liquefaction interface(s) to yield liquefied material, causing a relative movement of the tool with respect to the thermoplastic element, and causing portions of the liquefied material to penetrate into pores and/or cavities of the object;
allowing the liquefied material to harden; and
removing the tool,
wherein at the liquefaction interface, a full cross section of the thermoplastic element is liquefied.

8. The method according to claim 7, wherein no portion of the thermoplastic element that was not liquefied at the liquefaction interface(s) remains in the object or connected thereto after removal of the tool.

9. The method according to claim 7, wherein a radial extension of the tool is chosen to be approximately equal to or greater than an outer radial extension of the thermoplastic element.

10. The method according to claim 7, wherein a radial extension of the tool is chosen to be smaller than an inner diameter of the initial opening by at most 10%.

11. The method according to claim 7, wherein the face of the thermoplastic element is a distal face, wherein the tool comprises a proximally facing surface portion, wherein the liquefaction interface is an interface between the distal face of the thermoplastic element and the proximally facing surface portion of the tool, and wherein during the step of pressing, the tool is pulled towards a proximal direction.

12. The method according to claim 11, wherein the tool is chosen to comprise at least one radially protruding blade.

13. The method according to claim 7, wherein at least one of the following conditions is fulfilled:
a. in at least one axial depth, the thermoplastic element is segmented as a function of the circumferential angle so that at this axial depth the circumferential wall of the initial opening in first regions is in contact with the thermoplastic element and in second regions is not in contact with the thermoplastic element;
b. in at least one axial depth of a resulting, lined opening, the thermoplastic material is caused to be segmented as a function of the circumferential angle;
c. in a resulting, lined opening, the thermoplastic material is provided in at least two reinforced regions axially spaced from each other, wherein between the two reinforced regions there is a non-reinforced region;
d. the thermoplastic element does not have the symmetry of a rotational cylinder but is asymmetric with respect to rotation around any axis;
e. the tool comprises at least one radially protruding blade, protruding beyond an outer extension of the thermoplastic element and confining the flow of the liquefied thermoplastic material to certain azimuthal angles.

14. The method according to claim 7, wherein an auxiliary element is used to exert a counter force during the step of pressing the tool against the end face.

15. The method according to claim 14, wherein the auxiliary element comprises a distal foot, wherein during the step of pressing, the tool is pressed towards a distal direction, and the auxiliary element is compressed between the tool and the foot, and wherein after the step of causing portions of the liquefied material to penetrate into structures of the porous material, the auxiliary element is removed.

16. The method according to claim 7, wherein the tool comprises a distal broadening, wherein the face of the thermoplastic element is a distal end face, and wherein during the step of pressing, a tensile force is coupled into the tool.

17. The method according to claim 7, comprising the further step of providing an auxiliary element, wherein at least one of the following conditions is fulfilled:
F. during the step of coupling a pressing force and energy into the tool, an outer protection element at least partially encompasses the tool and locally prevents the tool from being in contact with the porous material;
G. the thermoplastic element is generally sleeve-shaped and comprises at least one indentation or hole in a sleeve wall;
H. during the step of coupling a pressing force and energy into the tool, in a telescoping region a portion of the tool encompasses a portion of the auxiliary element or a portion of the auxiliary element encompasses the tool, wherein at least one of the tool and of the auxiliary element comprises at least one protrusion facing to the other one of the tool and the auxiliary element, whereby in the telescoping region a contact between the tool and the auxiliary element at locations different from the at least one protrusion is prevented;
I. during the step of coupling a pressing force and energy into the tool, the tool is pressed towards the distal direction, and wherein the tool comprises a distal broadening forming an salient feature that prevents a contact between the tool and the porous material at locations proximally of the salient feature;
J. prior to the step coupling a pressing force energy into the tool, the thermoplastic element is connected to the tool by an axial positive-fit connection, and during the step of coupling a pressing force and energy into the tool, the auxiliary element is pressed against a distal direction to activate the step of liquefying material of the thermoplastic element and to push portions of the liquefied material aside and into the structures of the porous material.

18. The method according to claim 17, wherein at least condition A. is fulfilled, wherein the protection element comprises a tap for cutting a thread.

19. The method according to claim 17, wherein at least condition B. is fulfilled, wherein the thermoplastic element is generally sleeve-shaped.

20. The method according to claim 17, wherein at least condition C. is fulfilled, wherein at a distal end of the tool any remaining gap between the tool and the auxiliary element has a width of 0.2 mm or less.

21. The method according to claim 17, wherein at least condition E. is fulfilled, wherein the tool has a threaded outer surface portion, and wherein the threaded outer surface portion is encompassed by the thermoplastic element.

22. The method according to claim 7 wherein the energy coupled into the tool is mechanical vibration energy.

23. The method according to claim 7, wherein the instrument comprises a distal end with a piercing tip or a cutting edge or both, a piercing tip and a cutting edge, the method comprising the further step of placing the instrument with the distal end in contact with the porous material and pressing the instrument against the porous material to force the instrument into the porous material prior to the step of pressing the tool against the face.

24. The method according to claim 23, wherein during the step of forcing the instrument into the porous material, mechanical energy is coupled into the instrument.

25. The method according to claim 24, wherein the mechanical energy coupled into the instrument during the step of forcing is mechanical vibration energy.

26. The method according to claim 23, wherein the mechanical energy coupled into the tool is mechanical vibration energy, wherein during the step of coupling energy into the thermoplastic element the tool is caused to vibrate in a first vibration mode.

27. The method according to claim 26, wherein during the step of forcing the instrument into the porous material, mechanical energy is coupled into the tool, wherein during the step forcing, the tool is caused to vibrate in a second vibration mode.

28. The method according to claim 27, wherein the first vibration mode is different from the second vibration mode.

* * * * *